US009971901B2

United States Patent
Sato et al.

(10) Patent No.: US 9,971,901 B2
(45) Date of Patent: May 15, 2018

(54) CONTENT MANAGEMENT APPARATUS AND CONTENT MANAGEMENT METHOD

(71) Applicant: CANON KABUSHIKI KAISHA, Tokyo (JP)

(72) Inventors: Yuichiro Sato, Yokohama (JP); Takanori Ozawa, Yokohama (JP); Kei Kitagata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 14/293,464

(22) Filed: Jun. 2, 2014

(65) Prior Publication Data

US 2014/0365526 A1    Dec. 11, 2014

(30) Foreign Application Priority Data

Jun. 6, 2013   (JP) ................. 2013-119886

(51) Int. Cl.
*G06F 17/30* (2006.01)
*G06F 21/62* (2013.01)
(Continued)

(52) U.S. Cl.
CPC .......... *G06F 21/6209* (2013.01); *A63F 13/00* (2013.01); *G06F 17/30893* (2013.01); *G06Q 10/10* (2013.01); *H04M 1/274516* (2013.01)

(58) Field of Classification Search
CPC combination set(s) only.
See application file for complete search history.

(56) References Cited

U.S. PATENT DOCUMENTS

2003/0023677 A1*  1/2003  Morison Zuill ....... G06Q 10/10
                                                           709/203
2003/0167183 A1*  9/2003  Kido .............. G06Q 10/063112
                                                           705/7.14
(Continued)

FOREIGN PATENT DOCUMENTS

JP    2001-202405 A    7/2001
JP    2004-213265 A    7/2004
JP    2004-272380 A    9/2004

OTHER PUBLICATIONS

Notice of Rejection dated Jun. 2, 2017, in counterpart Japanese Patent Application No. 2013-119886 ( 7 pages including English translation).

*Primary Examiner* — Etienne Leroux
(74) *Attorney, Agent, or Firm* — Fitzpatrick, Cella, Harper & Scinto

(57) ABSTRACT

A content management apparatus as an embodiment of the present invention associates content information on content with group information on a user participation group in a posting management service that approves control for the content, and stores the associated information. The apparatus then acquires group information on the user participation group from the posting management service, upon receipt of a content control request. The apparatus determines whether or not the requested control is to be approved, based on the acquired group information and the group information stored in association with the content information on the content. This configuration allows the content management apparatus for managing the content to control access authorization according to setting of the group in the posting management service.

4 Claims, 29 Drawing Sheets

(51) Int. Cl.
*A63F 13/00* (2014.01)
*G06Q 10/10* (2012.01)
*H04M 1/2745* (2006.01)

(56) References Cited

U.S. PATENT DOCUMENTS

| | | | | |
|---|---|---|---|---|
| 2006/0246884 A1* | 11/2006 | Ansari | ............ | H04M 1/274516 455/419 |
| 2007/0143475 A1* | 6/2007 | Daigle | ................ | G06F 21/6245 709/225 |
| 2009/0144392 A1* | 6/2009 | Wang | ..................... | G06Q 10/10 709/217 |
| 2010/0017428 A1* | 1/2010 | Hamilton, II | ........... | A63F 13/00 707/E17.005 |
| 2010/0067052 A1* | 3/2010 | Iwasaki | ................ | H04N 1/3871 358/1.15 |
| 2010/0161758 A1* | 6/2010 | Tofigh | ..................... | H04L 67/06 709/218 |
| 2011/0320560 A1* | 12/2011 | Bennett | ................. | G06Q 50/01 709/217 |

* cited by examiner

| IDENTIFIER | URL |
|---|---|
| serviceA | http://serviceA.com |
| serviceB | http://serviceB.com |

2001
2002
1313

1901
1902  1903

CONTENT MANAGEMENT APPARATUS AND CONTENT MANAGEMENT METHOD

BACKGROUND OF THE INVENTION

Field of the Invention

The present invention relates to a content management apparatus, and a content management method.

Description of the Related Art

Recently, network infrastructure development has improved the speed of network circuits, and a grid computing technology. According to the improvement, cloud computing systems have started to be spread as modes for managing document files and form data and performing various processes on server computer sides. A user accesses a web page in a cloud service from a browser of a client computer via the Internet, and can upload, download, display or share the document files or form data.

Some cloud services have a microblog function. The microblog function is one of communication services. Through the microblog function, a user having an account in the service can post a short message. Unique identifiers are assigned to the respective posts of users. Furthermore, a web page that is dedicated for a user and called a "timeline" displays posts by the user himself/herself, posts by users who the user "follows", and posts to a group in which the user himself/herself participates. The display allows the user to follow another user and communicate via the group. Here, to "follow" is that the user registers another user for allowing posts by the other user to be displayed on the user's own web page. The "group" is a group of users classified according to common properties, such as participation organizations and projects of users. Posts to a group are displayed only on web pages by users participating in the group. The microblog services as described above include, for instance, Chatter by Salesforce.com.

In the foregoing document management service, cooperation with another service is important. Posting, to a microblog service, access URL information to a document and sharing information enables another user to be notified of presence of the document.

Japanese Patent Application Laid-Open No. 2004-213265 describes that a document creator individually assigns a signed access token to a viewer to thereby control access authorization for a document.

The cases of achieving a workflow through coordination of multiple services have increased. If the URL for a document registered in a document management service is shared by a microblog service, the document is sometimes intended to be viewed only by users participating in a specific group in the microblog service. However, the document management service and the microblog service are typically provided as different services, and have different security domains. That is, user management is performed separately in each service. There is thus a problem in that the document management service cannot achieve a configuration for allowing only users participating in the specific group in the microblog service to view the document.

SUMMARY OF THE INVENTION

In order to solve the problems discussed above, the present invention provides a content management apparatus, comprising: a storing unit configured to associate content information on content with group information on a user participation group in a posting management service that approves control for the content, and store the associated information; an acquisition unit configured to acquire group information on the user participation group from the posting management service, upon receipt of a content control request; and a determination unit configured to determine whether or not the requested control is to be approved, based on the group information acquired by the acquisition unit and the group information stored in association with the content information on the content.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
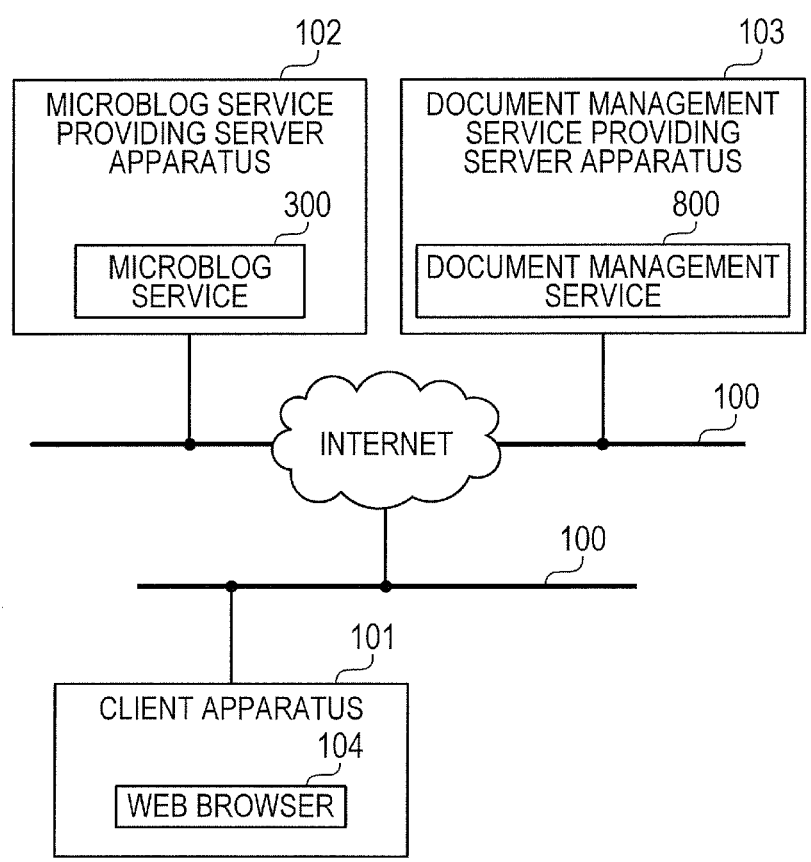
FIG. 1 is a diagram illustrating a configuration of a content sharing system.

FIG. 1 is a diagram illustrating a configuration of a content sharing system. The content sharing system includes a client apparatus 101, a microblog service providing server apparatus 102 and a document management service providing server apparatus 103. The client apparatus 101, the microblog service providing server apparatus 102 and the document management service providing server apparatus 103 are connected by a network 100 to allow communication with each other. The network may be, for instance, any of LAN and WAN, such as the Internet, telephone circuits, dedicated digital circuits, ATM (Asynchronous Transfer Mode) and frame relay circuits, cable television circuits, and wireless circuits for data broadcast. Alternatively, the network may be a communication network achieved by combination thereof, i.e., what is called a communication network. The network may be any of measures capable of data transmission and reception. Communication schemes between the services may be different. For instance, the communication scheme from the client apparatus 101 to the microblog service providing server apparatus 102 may be different from the communication scheme from this client apparatus to the document management service providing server apparatus 103.

The client apparatus 101 issues requests to the microblog service providing server apparatus 102 and the document management service providing server apparatus 103. The microblog service providing server apparatus 102 writes and reads a message and provides user information in response to the requests by the client apparatus 101 and the document management service providing server apparatus 103.

The microblog service providing server apparatus 102 manages information including messages and comments posted by users. The microblog service providing server apparatus 102 is an example of an apparatus that executes a posting management service.

The document management service providing server apparatus 103 is an example of an apparatus that executes a content management service, and manages documents as content. The document management service providing server apparatus 103 performs document management (content management), which includes registering, deleting, viewing and updating documents in response to requests issued by the client apparatus 101. The documents to be processed by the document management service providing server apparatus 103 are electronic data documents (various files of documents and images). The document management service providing server apparatus 103 stores the documents in association with respective URLs that uniquely identify the documents. The documents stored in the document management service providing server apparatus 103 are shared among users managed by the document management service providing server apparatus 103. The document management service providing server apparatus 103 is an example of a content management apparatus. The documents are an example of content.

The content sharing system posts information on documents managed through a document management service provided by the document management service providing server apparatus 103, to a microblog service provided by the microblog service providing server apparatus 102. A mechanism is thus provided that shares documents managed through the document management service among registered users of the microblog service. In this embodiment, the document management service and the microblog service are described so as to be executed by different apparatuses. However, these services may be realized in any of apparatuses included in the content sharing system. In another example, the microblog service and the document management service may be provided in an identical apparatus.

Figure 2:
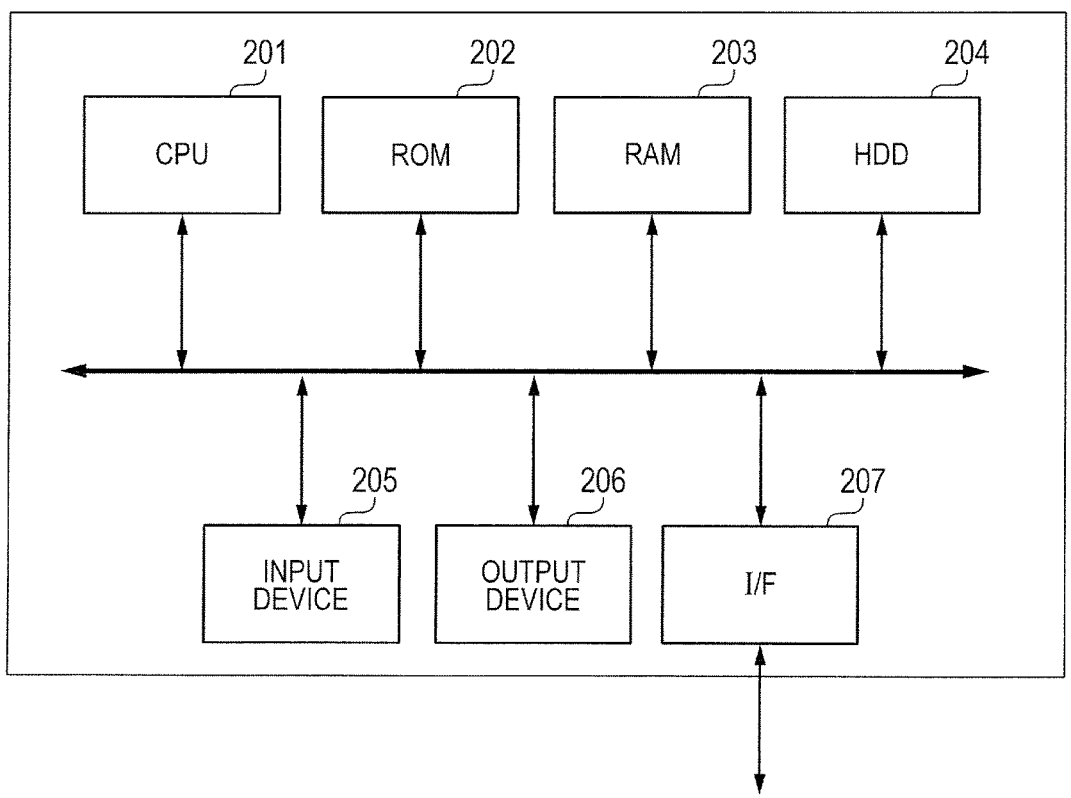
FIG. 2 is a diagram illustrating hardware configurations of a client apparatus, a microblog service providing server apparatus and a document management service providing server apparatus.

FIG. 2 is a diagram illustrating hardware configurations of the client apparatus 101, the microblog service providing server apparatus 102 and the document management service providing server apparatus 103 in FIG. 1. A CPU 201 executes a program for directly or indirectly controlling devices (after-mentioned ROM, RAM, etc.) connected via an internal bus to achieve after-mentioned various functions. A ROM 202 stores BIOS. A RAM (direct memory device) 203 is used as a working region for the CPU 201, and as a temporary memory where software modules for achieving the after-mentioned functions are loaded. A HDD 204 stores an OS (Operating System), which is basic software, and programs of software modules. An input device 205 is a keyboard and a pointing device, which are not illustrated. An output device 206 is a display device. An I/F 207 is an interface for connection to the network 100. In such hardware, after startup of the apparatus, the BIOS is executed by the CPU 201, the program of OS is loaded from the HDD 204 to the RAM 203 in an executable manner. The CPU 201 loads, on demand, the programs of after-mentioned various software modules from the HDD 204 to the RAM 203 in an executable manner according to the program of OS. The programs of the various software modules are executed and operated by the CPU 201 through cooperation of the foregoing devices. The I/F 207 is connected to the network 100 and controlled by the CPU 201 according to the program of OS to achieve communication in conformity with the foregoing communication scheme.

Mass computer hardware resources, such as the CPU 201, the ROM 202, the RAM 203, the I/F 207 and the HDD 204, illustrated in FIG. 2 may be virtualized. A platform on which virtualized software is to operate may be constructed on an open cloud platform for operation of the software. The program of software on the cloud platform is loaded on the RAM 203 included in the cloud platform, and executed by the CPU 201. The mass computer resources are virtualized by the cloud platform. Accordingly, the software is not required to be aware of the computer resources operating in the background of the cloud platform. Some typical forms of cloud platforms can register OS or web application. In this example, the form of the cloud platform is not required to be specified. The software on the cloud platform achieves communication in conformity with the foregoing communication scheme via the virtualized I/F 207.

The client apparatus 101 is a client computer for performing information processing. As described above, the CPU 201 loads the program stored in the HDD 204 onto the RAM 203 and executes the program to thereby achieve each software module to operate on the client apparatus 101. The client apparatus 101 is connected to the network 100 via the I/F 207. The client apparatus 101 may be a computer to which a permanent storage device is connected, or have a thin client configuration only including a temporary storage device. The client apparatus 101 includes a web browser 104. The client apparatus 101 uses the web browser 104 to issue requests to the microblog service 300 and the document management service 800. The web browser 104 analyzes HTML received from one of the microblog service 300 and the document management service 800, and displays an analyzed result on the display device; this browser thus displays various pieces of information on the display device that is the output device 206.

Figure 3:
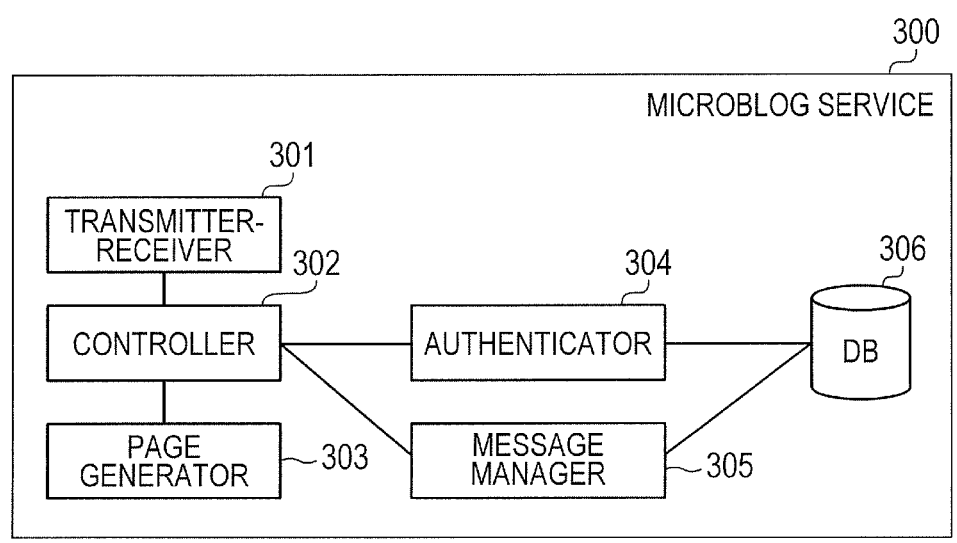
FIG. 3 is a diagram illustrating a configuration of a software module operating on the microblog service providing server apparatus.

FIG. 3 is a diagram illustrating a configuration of the software module (microblog service 300) operating on the microblog service providing server apparatus 102. The program stored in the HDD 204 illustrated in FIG. 2 is loaded onto the RAM 203 and executed by the CPU 201 to achieve each software module. The microblog service 300 includes a transmitter-receiver 301, a controller 302, a page generator 303, an authenticator 304 and a message manager 305. A DB 306 is referred to by the authenticator 304 and the message manager 305, and stored in the HDD 204 illustrated in FIG. 2.

The transmitter-receiver 301 processes communication with the web browser 104 of the client apparatus 101 and the document management service 800. The controller 302 performs processes in response to a request received by the transmitter-receiver 301. The page generator 303 generates a web page for returning a response to the web browser 104. The authenticator 304 authenticates a user having issued a login request, and further manages access authorization, which includes user information, group information, client information and token information. Authentication data referred to by the authenticator 304 when managing access authorization is stored in the DB 306. The message manager 305 stores message data in the DB 306, and acquires a message from the DB 306 and updates the message in response to a request. The DB 306 stores information on the message data of the microblog service 300 and the access authorization.

<Authentication and Authorization of Microblog Service 300>

Figure 4:
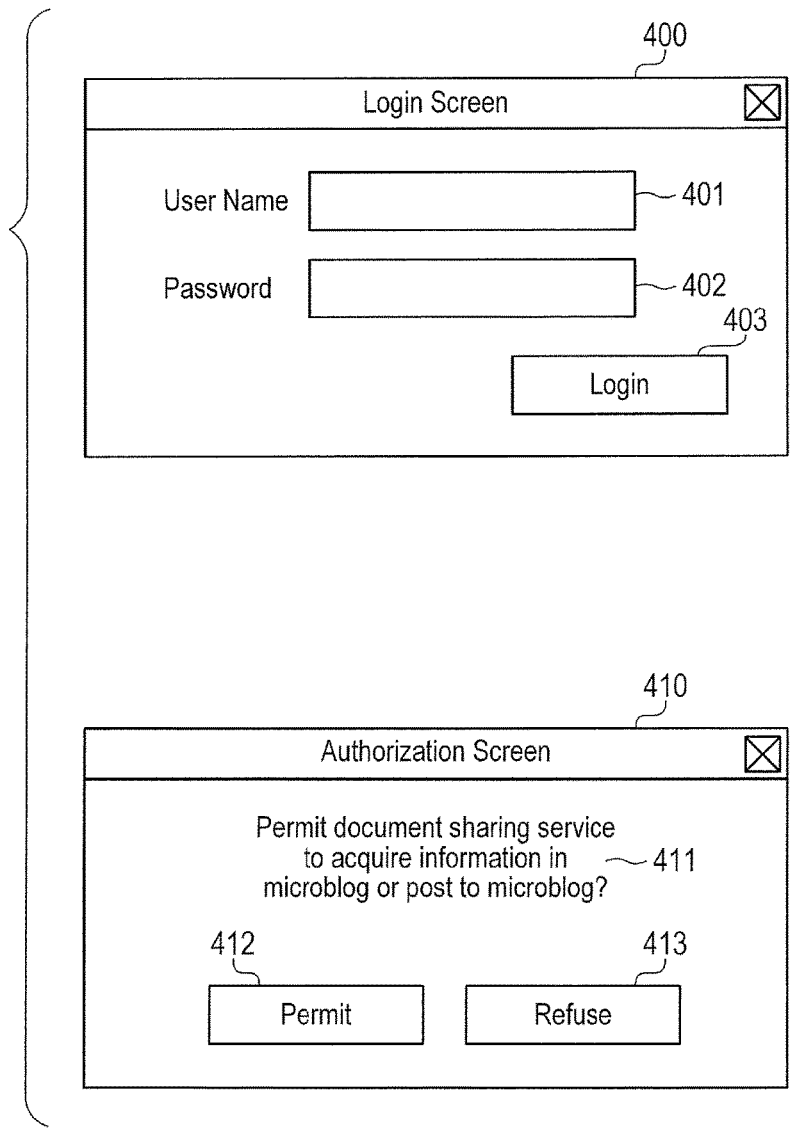
FIG. 4 is a diagram illustrating examples of a login screen and an authorization screen.

FIG. 4 is a diagram illustrating examples of a login screen 400 and an authorization screen 410. The login screen 400 and the authorization screen 410 are generated by the page generator 303 of the microblog service 300, and displayed by the web browser 104 of the client apparatus 101.

When a request is issued from the web browser 104 to the microblog service 300, the transmitter-receiver 301 accepts the request. Subsequently, a process is assigned by the controller 302 to the authenticator 304.

When the request is assigned, the authenticator 304 determines whether the authentication session is valid or not. The authenticator 304 notifies the controller 302 of the result of validity or invalidity of the authentication session. If the authentication session is invalid, the controller 302 causes the page generator 303 to generate the login screen 400, and returns the login screen 400 in response to the request. If the authentication session is valid, the controller 302 causes the page generator 303 to generate the authorization screen 410 and an after-mentioned timeline screen (FIG. 7) in response to the request. The controller 302 returns the generated authorization screen 410 and timeline screen in response to the request.

The authenticator 304 manages an authentication session using an authentication token. If the authentication succeeds, the authenticator 304 returns the authentication token to the web browser 104. The web browser 104 can continue the authentication by adding the authentication token to a request. Sessions for all requests to the microblog service 300 are managed by the authenticator 304. When the microblog service 300 receives a request, an authentication session is necessarily verified by the authenticator 304. However, in the following, description on a process of verifying an authentication session for each request is omitted for the sake of simplifying the description.

As illustrated in FIG. 4, the login screen 400 includes a user name 401, a password 402 and a login button 403. The user name 401 and password 402 are input fields for a user name and a password, respectively, which are required for authentication for the microblog service 300. When the login button 403 is clicked, the web browser 104 transmits, to the microblog service 300, a login request that includes the input user name 401 and password 402 as parameters. The authorization screen 410 includes an authorization message 411, a permit button 412 and a refuse button 413. The authorization screen 410 is for confirming the user whether or not to provide the document management service 800 with approval (authorization) for accessing information managed by the microblog service 300. The authorization method typically adopts an OAuth protocol. The authorization screen 410 is an example of an authorization screen defined by the OAuth protocol.

The document management service 800 transmits an authorization request with a scope as a parameter via the web browser 104 to the microblog service 300 when generating, acquiring, updating or deleting information in the microblog service 300. The scope indicates a range of authentication and authorization. The document management service 800 according to this embodiment designates the scope such that the authorization range encompasses information acquisition and message posting in the microblog service 300.

When the transmitter-receiver 301 of the microblog service 300 receives the authorization request, the controller 302 instructs the page generator 303 to generate the authorization screen 410. The controller 302 returns the authorization screen 410 in response to the authorization request issued by the web browser 104.

The authorization message 411 is for providing a user with information on authorization. In the example illustrated in FIG. 4, a message as the authorization message 411 is displayed that requests the document management service 800 to authorize information acquisition and message posting in the microblog service 300 that are designated by the scope. Upon clicking of the permit button 412, the web browser 104 transmits an authorization approval request to the microblog service 300. Upon clicking of the refuse button 413, the web browser 104 transmits an authorization disapproval request to the microblog service 300.

When the transmitter-receiver 301 of the microblog service 300 accepts the authorization approval request, the authenticator 304 issues an approval code. The approval code is transmitted via the web browser 104 to the document management service 800.

The document management service 800 transmits, to the microblog service 300, a token acquisition request with the received approval code and client information as parameters. Upon receipt of the token acquisition request, the microblog service 300 confirms agreement of the requested client information with after-mentioned client information 520 (FIG. 5), and issues token information 530. The microblog service 300 returns, to the document management service 800, the access token 532 and the refresh token 533 in response to the token acquisition request. The document management service 800 adds the access token 532 to a request to be issued to the microblog service 300. Thus, the document management service 800 can issue a request with a target that is a scoped range in the microblog service 300.

The refresh token 533 is for updating the access token 532. When the microblog service 300 receives the refresh token and the client information through the token update request, this service confirms agreement with the refresh token 533 and the client information 520 that are stored in this service.

If the microblog service 300 confirms the agreement of the client information 520, this service updates the access token 532 and the refresh token 533. The microblog service 300 returns the newly updated access token 532 and refresh token 533 in response to the token update request. Expiration dates for use are set on the access token 532 and the refresh token 533. At a timing when the expiration date for use of the access token 532 expires, the access token 532 is updated using the refresh token 533.

Figure 5:
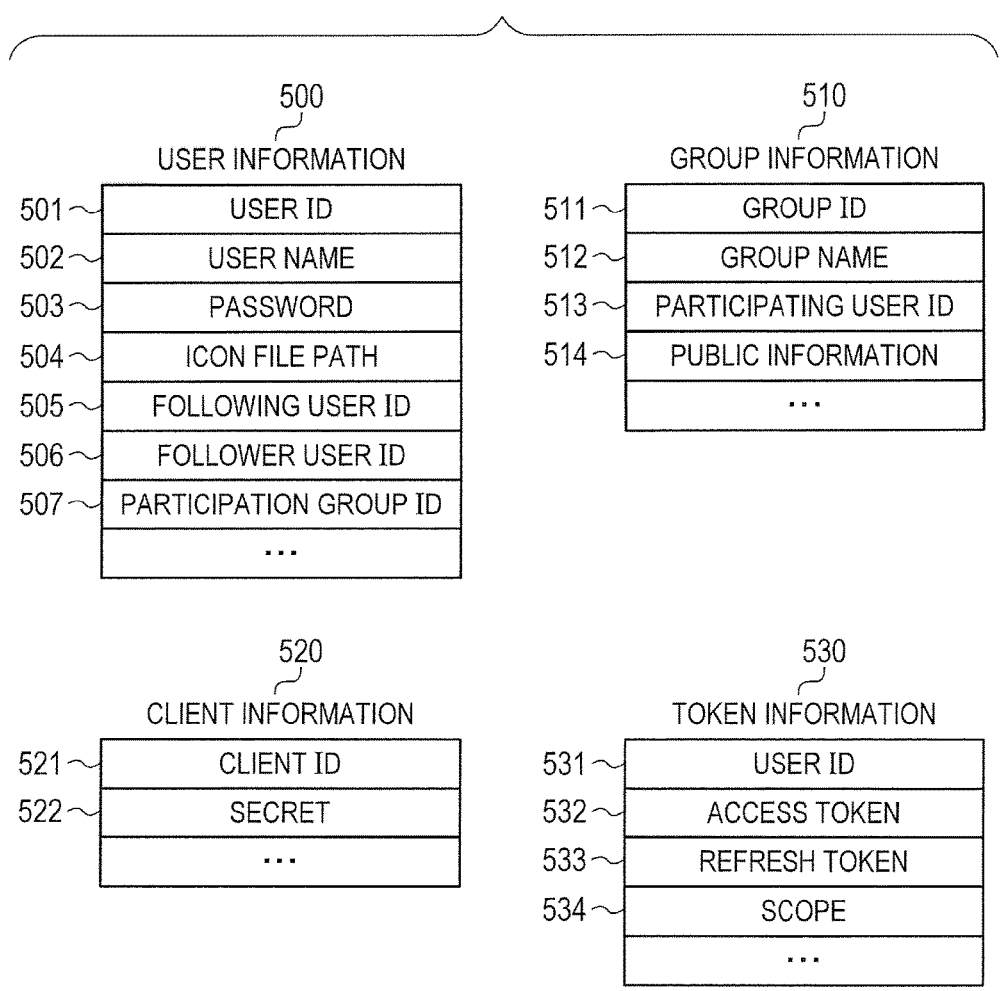
FIG. 5 is a diagram illustrating examples of user information, group information, client information and token information that are managed by an authenticator of a microblog service and stored in a DB.

FIG. 5 is a diagram illustrating examples of user information 500, group information 510, client information 520 and token information 530, which are managed by the authenticator 304 of the microblog service 300 and stored in the DB 306. The user information 500 pertains to a user registered in the microblog service 300. The user information 500 contains a user ID 501, a user name 502, a password 503, an icon file path 504, a following user ID 505, a follower user ID 506 and a participation group ID 507. The user ID 501 is an identifier for uniquely identifying the user information 500. The user name 502 and the password 503 are a user name and a password that are required for authentication, respectively. The icon file path 504 is a storage destination file path for an icon image indicating the user.

The following user ID 505 is for a user ID of a user who the user concerned follows, and can store multiple user IDs. The follower user ID is for a user ID of a user who follows the user concerned, and can store multiple user IDs. "Follow" is described later. The participation group ID 507 is for a group ID of a group in which the user participates, and can store multiple group IDs.

The group information 510 is information on a group in which a registered user of the microblog service 300 participates. The group information 510 contains a group ID 511, a group name 512, a participating user ID 513 and public information 514. The user can generate a group and participate in the generated group. The group ID 511 is an identifier for uniquely identifying the group information 510. The group name 512 is a name assigned to the group. The participating user ID 513 is a user ID of a user participating in the group, and can store multiple user IDs. The public information 514 is a flag for determining to allow access by a user other than users participating in the group, and set to be public or private.

The client information 520 contains a client ID 521 and a secret 522. The client ID 521 is an identifier for uniquely identifying the client information 520 of a client connected to the microblog service 300. The secret 522 is a password for the client. The client ID 521 and the secret 522 are issued by the microblog service 300. The client apparatus 101 uses the client ID 521 and the secret 522 to issue an authorization approval request to the microblog service 300.

The token information 530 contains a user ID 531, an access token 532, a refresh token 533 and a scope 534. The token information 530 is information for managing a token issued through authorization by the microblog service 300. The user ID 531 is a user ID to which the token is issued. The access token 532 is a token used when the client apparatus 101 issues a request. The refresh token 533 is a token for updating the access token 532. The scope 534 is information designating an authorization range.

<Microblog Function of Microblog Service 300>

The microblog service 300 provides the microblog function. The microblog function is a function of allowing a user to share a message posted to the microblog service 300 with another user or in a specific group. The user can post a message, post a message to the group, and refer to a shared message. The microblog service 300 also provides a function of making a comment for a posted message.

Figure 6:
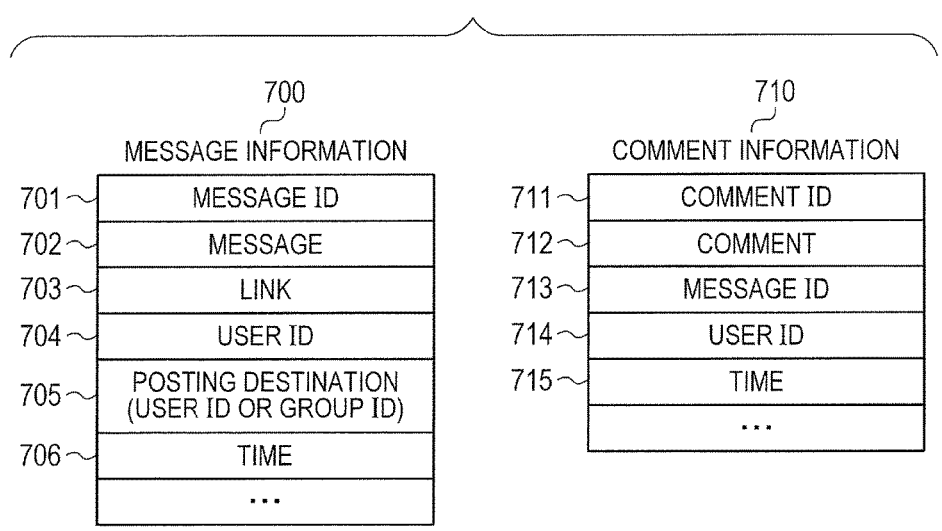
FIG. 6 is a diagram illustrating examples of message information and comment information.

FIG. 6 is a diagram illustrating examples of message information 700 and comment information 710. The message information 700 is information on a message posted to the microblog service 300. The comment information 710 is information on a comment posted to the microblog service 300.

The message information 700 contains a message ID 701, a message 702, a link 703, a user ID 704, a posting destination 705 and a time 706. When the microblog service 300 accepts a message posting request that is a request for posting a message, the message information 700 is generated by the message manager 305 and stored in the DB 306. The message ID 701 is a posting identifier for uniquely identifying the message information 700. The message 702 is a posted message character string. The link 703 is a URL of the post. The user ID 704 is a user ID of the user having posted the message. The posting destination 705 is a destination to which the message has been posted. Furthermore, the posting destination 705 is information identifying message sharing users who share the message which is the posted content with the user having posted the message. More specifically, the posting destination 705 stores one of a user ID and a group ID. Alternatively, the posting destination 705 may store multiple user IDs and multiple group IDs. Even though without registration in the posting destination 705, it is a matter of course that the user having made the post shares the posted content and is one of the message sharing users. If the destination of the message is not designated, the posting destination 705 stores no content. The time 706 is the date and time on which the message was posted. The message information 700 in the microblog service 300 thus associates the message ID with the user ID and the group ID of the posting destination.

The comment information 710 contains a comment ID 711, a comment 712, a message ID 713, a user ID 714 and a time 715. The comment information 710 is generated by the message manager 305 and stored in the DB 306 when the microblog service 300 accepts a comment posting request. The comment ID 711 is an identifier for uniquely identifying the comment information 710. The comment 712 is a posted comment character string. The message ID 713 is the message ID of the message information 700 posted by the user. The user ID 714 is the user ID of a user having posted a comment. The time 715 is the date and time on which the comment was posted. The message information 700 and the comment information 710 are stored in the DB 306. That is, the DB 306 associates the message ID with the message sharing user information, and stores the associated information.

Figure 7:
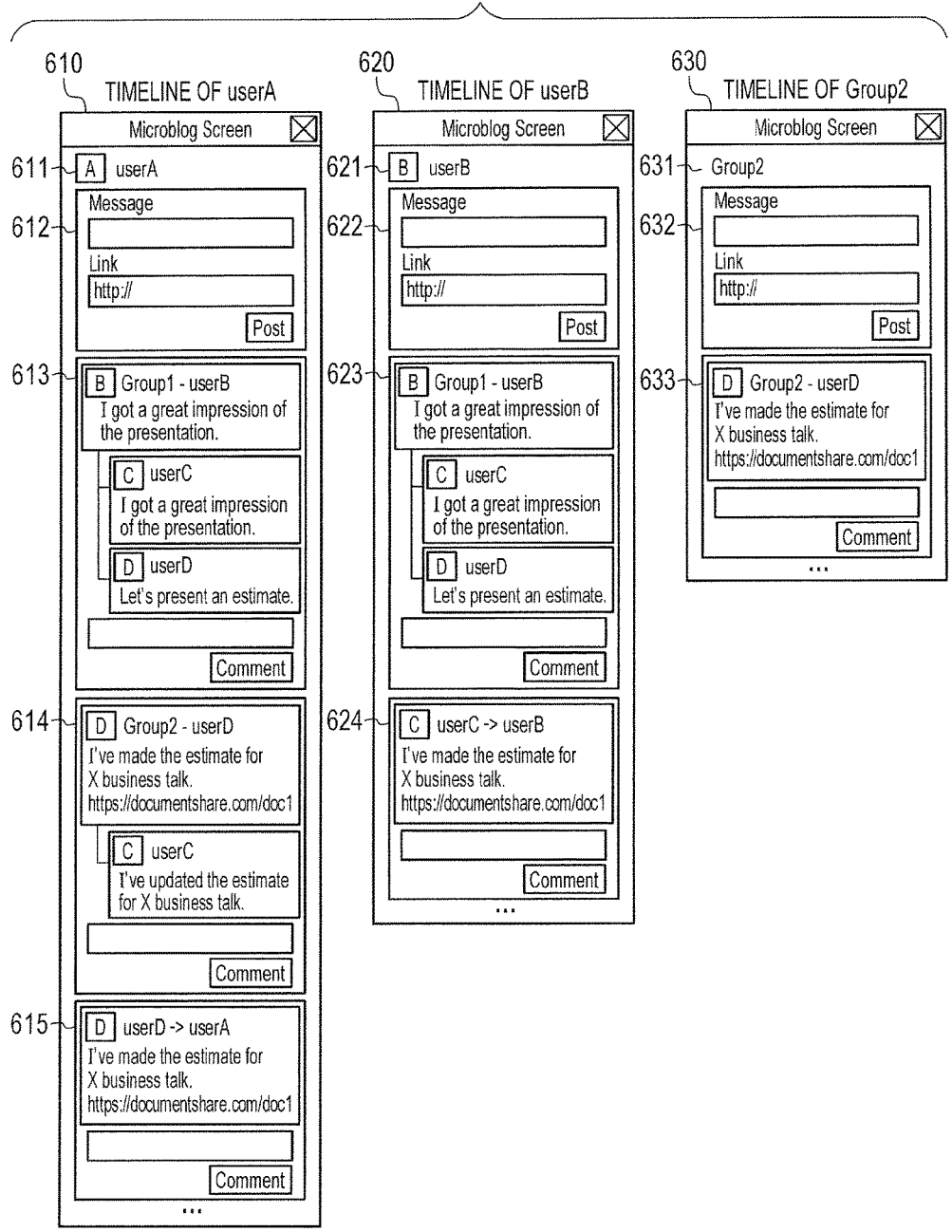
FIG. 7 is a diagram illustrating timeline screens in Embodiment 1.

FIG. 7 is a diagram illustrating examples of timeline screens of Embodiment 1. A timeline screen 610 is for a user who is "userA". A timeline screen 620 is for a user who is "userB". A timeline screen 630 is for a group which is "Group2".

If the microblog service 300 successfully authenticates the user, this service generates a timeline screen of the authenticated user and returns the screen to the web browser 104. The timeline screens 610 and 620 for the users include user information display regions (611 and 621), message posting regions (612 and 622) and comment posting regions (613 to 615 and 623 and 624).

The user information display regions (611 and 621) contain an user icon and a user name. An image stored in a region designated by the icon file path 504 is displayed as the user icon. Information in the user name 502 is displayed as the user name. The message posting regions (612 and 622) contain a message input field, a link input field and a posting button. When the posting button is clicked, the web browser 104 transmits, to the microblog service 300, a message posting request that includes information in the message input field and the link input field as parameters. Upon receipt of the message posting request, the microblog service 300 generates the message information 700. Subsequently, the microblog service 300 regenerates a timeline screen and returns this screen to the web browser 104.

The comment posting regions (613 to 615 and 623 and 624) contain a message display region, a comment display region, a comment input field and a comment button. The message display region contains the user icon and the user name of the user having posted the message, the posting destination, the message and the link. The user icon is an image stored in the icon file path 504 associated with the user ID 704. The posting destination is the user name 502 or the group name 512 that are associated with the user ID or the group ID stored in the posting destination 705, respectively.

In the comment display region, pieces of comment information with the message ID 713 that agrees with the message ID 701 of the message displayed in the message display region are displayed in descending order of time 715. The comment display region contains the user icon, the user name 502 and the comment 712 of the user having posted the comment. The user icon is an image stored in the icon file path 504 associated with the user ID 714.

When the comment button is clicked, the web browser 104 transmits, to the microblog service 300, a comment posting request including input data in the comment input field as a parameter. Upon receipt of the comment posting request, the microblog service 300 generates the comment information 710 and subsequently regenerates a timeline screen and returns the screen to the web browser 104.

The comment posting region 613 is an example where comments by userC and userD to the message posted by userB to Group1 are displayed. The comment posting region 614 is an example where the message and link posted by userD to Group2 are displayed.

The comment posting region 615 is an example where the message and link posted by userD to userA are displayed. The comment posting region 623 is the same as the comment posting region 613. The comment posting region 624 is an example where the message and link posted by userC to userB are displayed.

The message information 700 displayed on the timeline screen of the own user satisfies the following three conditions. The first condition is that the user ID 704 agrees with the user ID 501 or the following user ID 505. The second condition is that the user ID as the posting destination 705 agrees with the user ID 501 of the own user. The third condition is that the group ID of the posting destination 705 agrees with the participation group ID 507.

Through the timeline screen for the user, a timeline screen of another user can also be referred to. The timeline screen for the other user is linked to the user name on the timeline screen, and displayed by clicking the link. The message information 700 displayed on the timeline of the other user satisfies the following three conditions. The first condition is that the user ID 704 agrees with the user ID 501 of the own user or the displayed user. The second condition is that the user ID 704 agrees with the following user ID 505 of the displayed user. The third condition is that the group ID of the posting destination 705 agrees with the displayed user participation group ID 507, and public information 514 is set to be public. The message information 700 satisfying the conditions and the comment information 710 associated with the message are displayed on the timeline screen for the user.

The display order in the comment display region is descending order of time concerning the time 706 of the message information 700 and the time 715 of the comment information 710 that are displayed in the comment display region.

The timeline screen 630 in FIG. 7 is a timeline screen for "Group2". The timeline screen 630 for the group is linked to the group name on the timeline screen, and displayed by clicking the link. The timeline screen for the group contains a group information display region 631, a message posting region 632 and a comment posting region 633. In the group information display region 631, information on the group name 512 is displayed. The message posting region 632 is analogous to the message posting regions (612 and 622) on the timeline screen of the user, but receives a post whose posting destination is a group. The comment posting region 633 is analogous to the message posting regions (613 to 615 and 623 and 624) on the timeline screen of the user.

The message information 700 displayed on the timeline screen 630 for the group satisfies the following conditions. The first condition is that the group ID as the posting destination 705 agrees with the group ID 511 of the displayed group. The second condition is that the group ID 511 of the displayed group agrees with the own user participation group ID 507. The third condition is that the public information 514 of the displayed group is set to be public.

The message information 700 satisfying the conditions and the comment information 710 associated with the message are displayed on the timeline screen for the group. The display order of the comment display region is descending order of time concerning the time 706 of the message information 700 and the time 715 of the comment information 710 that are displayed in the comment display region.

<WebAPIs of Microblog Service 300>

The microblog service 300 provides webAPIs. The webAPIs are functions of registering, acquiring, updating and deleting information managed by the microblog service 300 in response to a request. The information managed by the microblog service 300 is the user information 500, the group information 510, the token information 530, message information 700 and the comment information 710.

For issuing a request from the client apparatus 101 to a webAPI, it is required to perform the authorization and add the access token 532, the client ID 521 and the secret 522 to the request. Requests to be issued to the webAPIs include registering, acquiring, updating and deleting any of the user information 500, the group information 510, the message information 700 and the comment information 710. Furthermore, requests to be issued to the webAPIs further include a token update request, a user timeline acquisition request and a group timeline acquisition request.

The token update request is a request to update the access token 532. The microblog service 300 adds the refresh token 533, the client ID 521 and the secret as parameters of the token update request to reissue the access token 532 and the refresh token 533, and returns the tokens.

The user timeline acquisition request is a request to acquire the timeline of the user ID 501 designated in the parameter. Information capable of being acquired by the user timeline acquisition request is the message information 700 and the comment information 710 that are displayed in the comment posting regions (613 to 615 and 623 and 624) on the timeline screen for the user in FIG. 7. The conditions of the message information 700 capable of being acquired by the user timeline acquisition request are the same as the conditions of the message information 700 displayed on the timeline screen of the user.

A group timeline acquisition request is a request to acquire a timeline for the group ID 511 that is designated by the parameter. Information capable of being acquired through the group timeline acquisition request is the message information 700 and the comment information 710 that are displayed in the comment posting region 633 on the timeline screen for the group in FIG. 7. The conditions of the message information 700 capable of being acquired through the group timeline acquisition request is the same as the conditions of the message information 700 capable of being displayed on the timeline screen of the group.

In the request to acquire information from the webAPI, a query can be designated as a parameter. The query is a condition of searching for data. The microblog service 300 returns information satisfying the search condition designated by the query. For instance, in the case where multiple message IDs 701 are designated as a query in a message information acquisition request, the microblog service 300 returns the message information 700 that has the same message ID 701 designated through the query from the message information 700 managed by this service.

<Software Module Configuration of Document Management Service Providing Server Apparatus>

Figure 8:
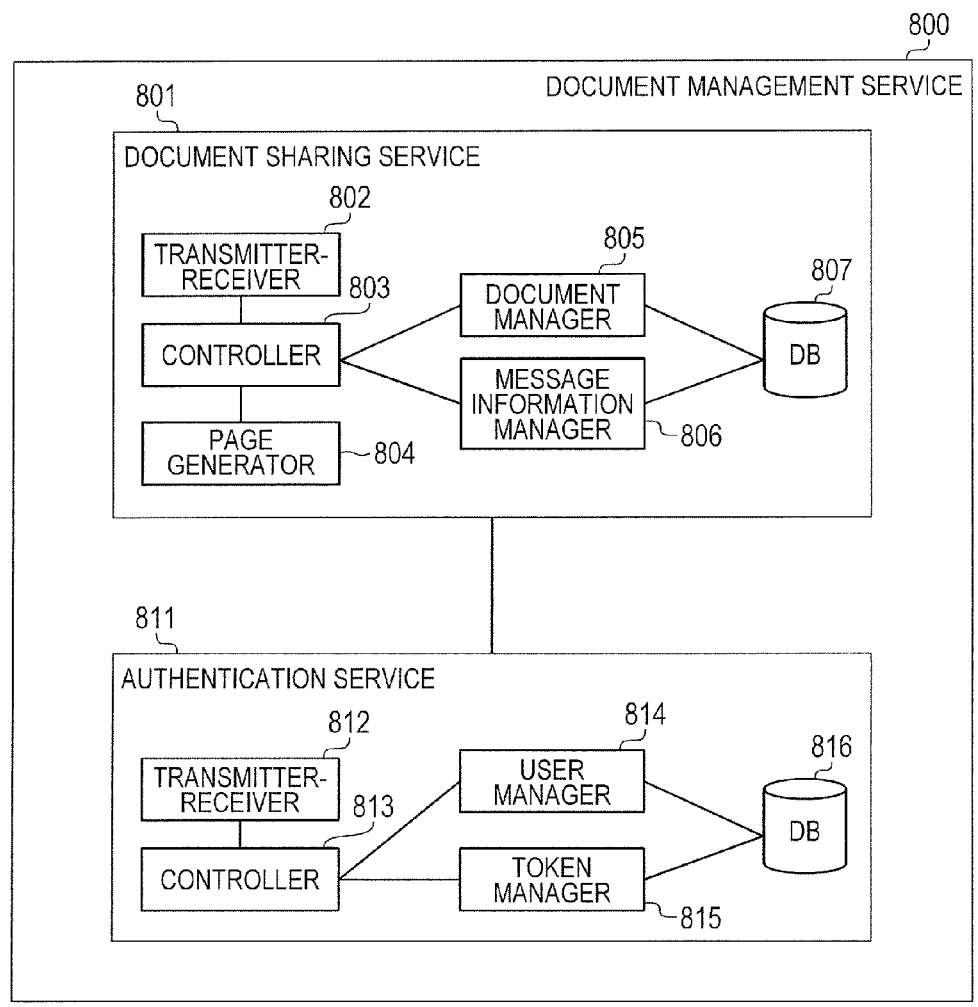
FIG. 8 is a diagram illustrating a configuration of a software module of the document management service providing server apparatus.

FIG. 8 is a diagram illustrating configurations of the software modules (document management service 800) of the document management service providing server apparatus 103. The document management service 800 includes a document sharing service 801 and an authentication service 811. The document sharing service 801 includes a transmitter-receiver 802, a controller 803, a page generator 804, a document manager 805 and a message information manager 806. The authentication service 811 includes a transmitter-receiver 812, a controller 813, a user manager 814 and a token manager 815. The programs of the software modules are stored in the HDD 204 illustrated in FIG. 2, loaded by the CPU 201 into the RAM 203 and executed to thereby achieve the respective software modules, as described above. A DB 807 is a database referred to by the document sharing service 801, and stored in the HDD 204 illustrated in FIG. 2. Likewise, a DB 816 is a database referred to by the authentication service 811, and stored in the HDD 204.

The transmitter-receiver 802 processes communication of the client apparatus 101 with the web browser 104, the microblog service 300 and the authentication service 811. The controller 803 executes processes in response to a request accepted by the transmitter-receiver 802. The page generator 804 generates a web page that is to be returned as a response to the web browser 104.

The document manager 805 manages documents and after-mentioned document information 1400 that are stored in the DB 807. For instance, the document manager 805 registers, acquires, updates and deletes the documents and the document information 1400 according to a request issued by the controller 803.

The message information manager 806 manages the message information 1410 on the DB 807. For instance, the message information manager 806 registers, acquires, updates and deletes the message information 1410 in response to a request. Here, the message information 1410 is information that associates the documents and the document information 1400 with messages in the microblog service 300.

The DB 807 stores not only the documents, the document information 1400 and the message information 1410 but also user setting information in the document sharing service 801.

The transmitter-receiver 812 of the authentication service 811 processes communication with the document sharing service 801. The controller 813 executes processes in response to a request accepted by the transmitter-receiver 812. The user manager 814 manages after-mentioned user information 1420 stored in the DB 816. For instance, the user manager 814 registers, acquires, updates and deletes the user information 1420 in response to a request issued by the controller 813.

The token manager 815 manages after-mentioned authentication token information 1430 and the microblog access token information 1440 that are stored in the DB 816, in the same manner as that of the user information 1420. For instance, the token manager 815 registers, acquires, updates and deletes the authentication token information 1430 and the microblog access token information 1440 in response to a request issued by the controller 813.

<Authentication of Document Management Service>

Figure 9:
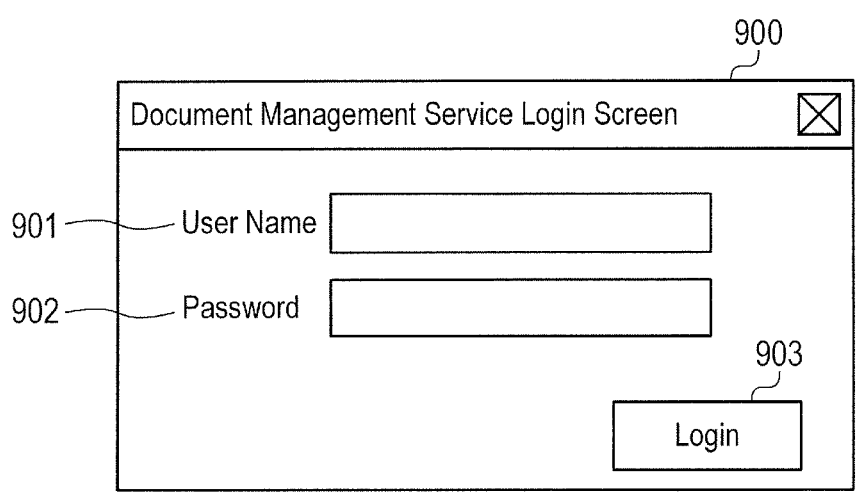
FIG. 9 is a diagram illustrating an example of a login screen that is generated by a page generator of a document management service in Embodiment 1 and displayed on a web browser of a client terminal.

FIG. 9 is a diagram illustrating an example of a login screen 900 that is generated by the page generator 804 of the document management service 800 and displayed on the web browser 104 of the client apparatus 101 in Embodiment 1.

A request is transmitted from the web browser 104 to the document management service 800. The transmitter-receiver 802 then accepts the request, and an authentication checking request is transmitted from the controller 803 through the transmitter-receiver 802 to the authentication service 811. At this time, the controller 803 determines whether the request includes an authentication token 1331 or not. If the token is included, the authentication token is passed to the authentication service 811. When the authentication service 811 causes the transmitter-receiver 812 to accept the request, the controller 813 requests the token manager 815 to check the validity of after-mentioned authentication token information 1330.

The controller 813 receives the result of whether the authentication token is valid or not from the token manager 815, and causes the transmitter-receiver 812 to transmit the result to the document sharing service 801. For checking the validity of the authentication token, the authentication token information 1330 is referred to and it is checked whether the corresponding authentication token 1331 is stored or not and whether the expiration date is reached or not based on a time 1333. If the authentication token is invalid, the controller 803 of the document sharing service 801 causes the page generator 804 to generate the login screen 900 and returns the login screen 900 in response to the request. If the authentication token is valid, the controller 803 generates an after-mentioned preview screen 1000 and returns this screen in response to the request.

The login screen 900 includes a user name 901, a password 902 and a login button 903. The user name 901 and the password 902 are input fields for receiving a user ID and a password, respectively, which are required for authentication to the document management service 800. When the login button 903 is clicked, the login request including the input user name 401 and password 402 as parameters are transmitted to the document management service 800.

The appropriateness of the login request is checked by the controller 813 of the authentication service 811. The controller 813 verifies whether the combination of the user name 901 and the password 902 contained in the login request exist in after-mentioned user information 1320 or not. If the combination exists, the controller 813 issues the authentication token information 1330, stores the information in the DB 816 and returns the authentication token 1331 to the web browser 104. The web browser 104 can continue authentication by adding an authentication ID to the request. All requests to the document management service 800 are subjected to authentication information management by the authentication service 811. When the document management service 800 receives a request, the authentication information is necessarily verified. However, in this embodiment, description on verification of the authentication information is omitted for the sake of simplification.

<Management Information in Document Management Service>

Figure 10:
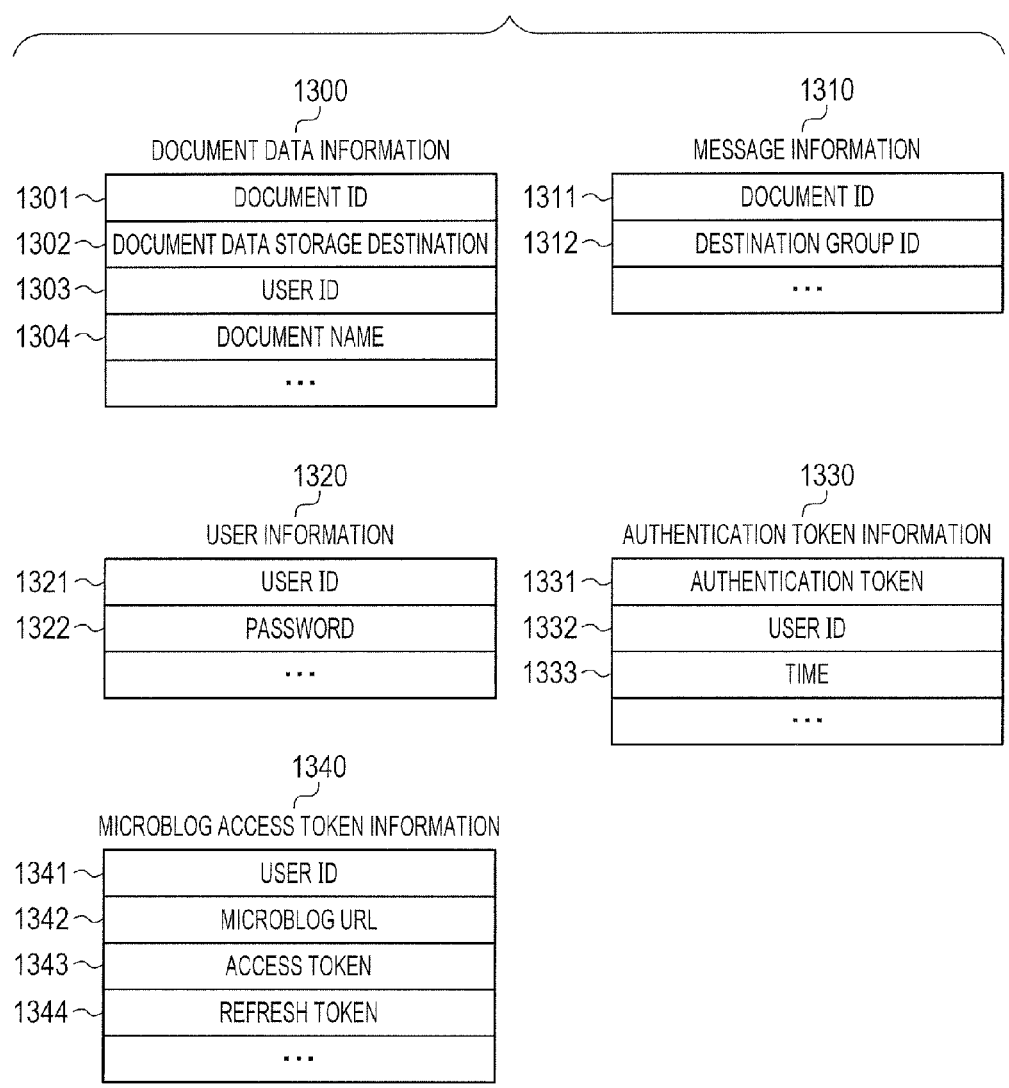
FIG. 10 is a diagram illustrating examples of document data information, message information, user information and authentication token information that are managed on a document sharing service and an authentication service that are included in the document management service.

FIG. 10 is a diagram illustrating examples of document data information 1300, message information 1310, user information 1320 and authentication token information 1330 that are managed in the document sharing service 801 and the authentication service 811 that are included in the document management service 800. The document data information 1300 and the message information 1310 are information on document data stored in the DB 807 of the document sharing service 801.

The document data information 1300 is additional information on the document data, and contains a document ID 1301, a document data storage destination 1302, a user ID 1303 and a document name 1304. The document ID 1301 is an identifier for uniquely identifying the document data. The document data storage destination 1302 indicates one of a file path and a URL that are required to access the document data. The user ID 1303 is an identifier that indicates the user in the document management service where the document data is registered. The document name 1304 is a title of the document data, and a character string that the user can arbitrarily determine. The document data information 1300 is an example of content information. The document data information 1300 may contain not only these items but also any piece of information on the document data, such as the size and the total number of pages of the document data.

The message information 1310 is for storing information that is on a message posted to the microblog service 300 and pertains to the document data stored in the document sharing service 801. The message information 1310 contains a document ID 1311 and a destination group ID 1312. The document ID 1311 is an identifier for associating the document data information 1300 with the message information 1310. The destination group ID 1312 represents the message destination group ID in the microblog service 300.

The user information 1320, the authentication token information 1330 and microblog access token information 1340 are information on the document data stored in the DB 816 of the authentication service 811. The user information 1320 is information on a user registered as a user of the document management service 800. The user information 1320 contains a user ID 1321 and a password 1322. The user ID 1321 is an identifier for uniquely identifying a user in the document management service 800. The password 1322 is a password used for authentication together with the user ID 1321 when the user logs in the document management service 800 via the web browser 104. The user information 1320 may contain not only these items but also any piece of information on the user, such as the name or an email address.

The authentication token information 1330 is authentication information on the user having already logged in the document management service 800. The authentication token information 1330 contains an authentication token 1331, a user ID 1332 and a time 1333. The authentication token 1331 is a character string that is for proving successful authentication and unique at least in the document management service. The user ID 1332 represents the user ID of a user having already been authenticated. The time 1333 stores the date and time for determining the expiration date of the authentication token 1331.

The microblog access token information 1340 is authorization information on a user that the document management service 800 requires when accessing the microblog service 300. The microblog access token information 1340 contains a user ID 1341, a microblog URL 1342, an access token 1343 and a refresh token 1344. The user ID 1341 is an identifier for identifying a user in the document management service 800, and corresponds to the user ID 1321 of the user information 1320. The microblog URL 1342 is the URL of a microblog for which the microblog access token information 1340 is to be used. The access token 1343 is a character string that contains authorization information required to access the microblog URL 1342 with the user ID 1341. The refresh token 1344 is a token that is issued by the microblog service 300 and required to update the access token 1343.

<Document Preview in Document Sharing Service 801>

Figure 11:
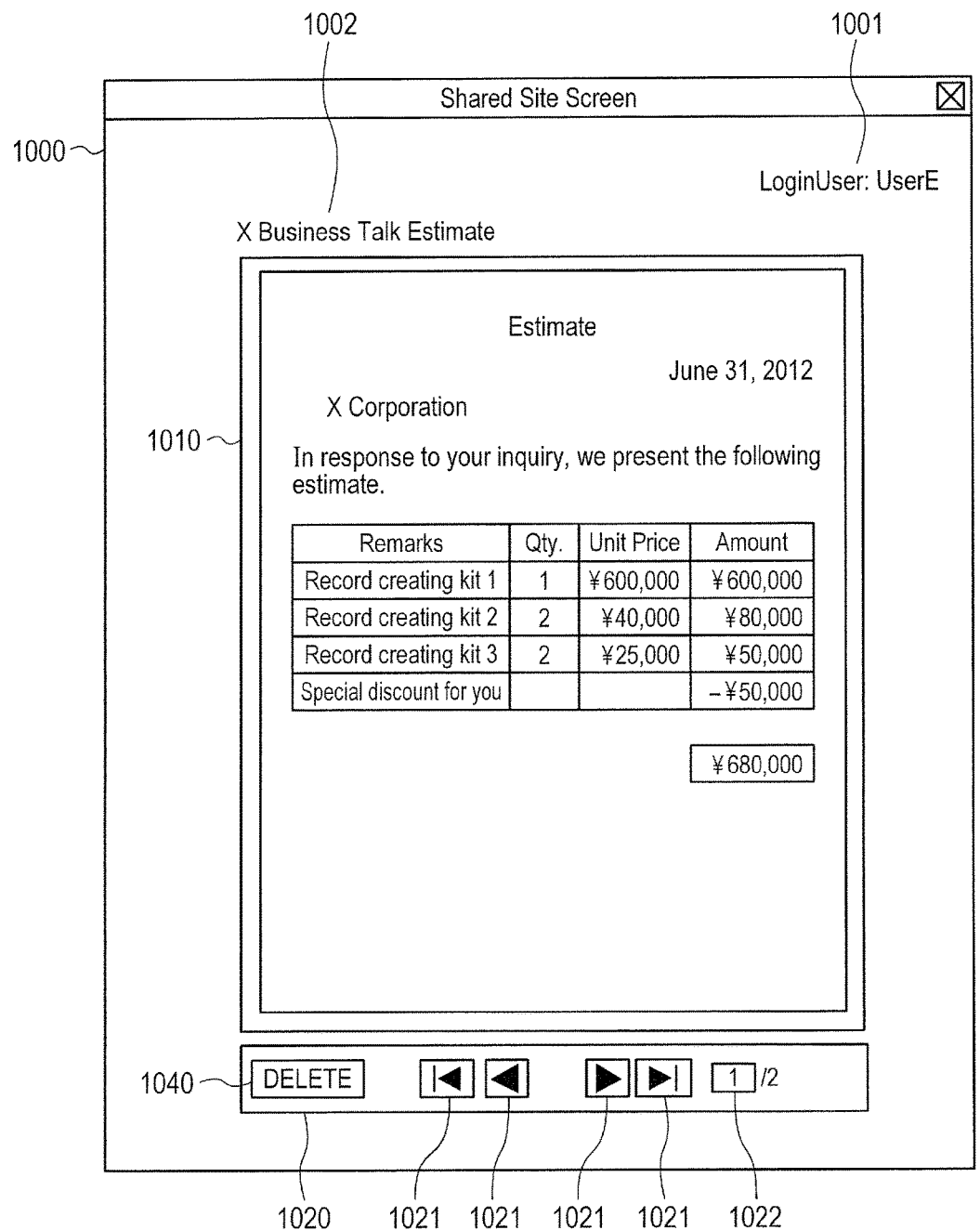
FIG. 11 is a diagram illustrating an example of a document preview screen that is generated by the page generator of the document sharing service and displayed on the web browser of the client terminal.

FIG. 11 is a diagram illustrating an example of a preview screen 1000 that is generated by the page generator 804 of the document sharing service 801 and displayed by the web browser 104 of the client apparatus 101.

When a document preview request including information that identifies the document is issued from the web browser 104 to the document sharing service 801, the transmitter-receiver 802 accepts the request and the controller 803 acquires the document data information 1300 from the document manager 805. Here, the information that identifies the document and is transmitted from the web browser 104 is, for instance, a URL containing the document ID 1301. The controller 803 refers to the document ID 1301 contained in the URL to allow the document data information 1300 matching with the request to be acquired from the document manager 805. The controller 803 refers to the acquired document data information 1300, and causes the page generator 804 to generate the preview screen 1000 capable of being displayed on the web browser 104. Furthermore, the controller 803 causes the transmitter-receiver 802 to return the generated preview screen 1000 to the web browser 104. On the preview screen 1000, a document data image 1010 is displayed that has been acquired by referring to the document data storage destination 1302 of the document data information 1300, and the document name 1002 and the user name 1001 are also displayed. In a region 1020 for allowing a preview operation, a button 1021 for page feeding and an input area 1022 for allowing a display page to be designated are displayed.

<Document Registration to Document Management Service 800>

Figure 12:
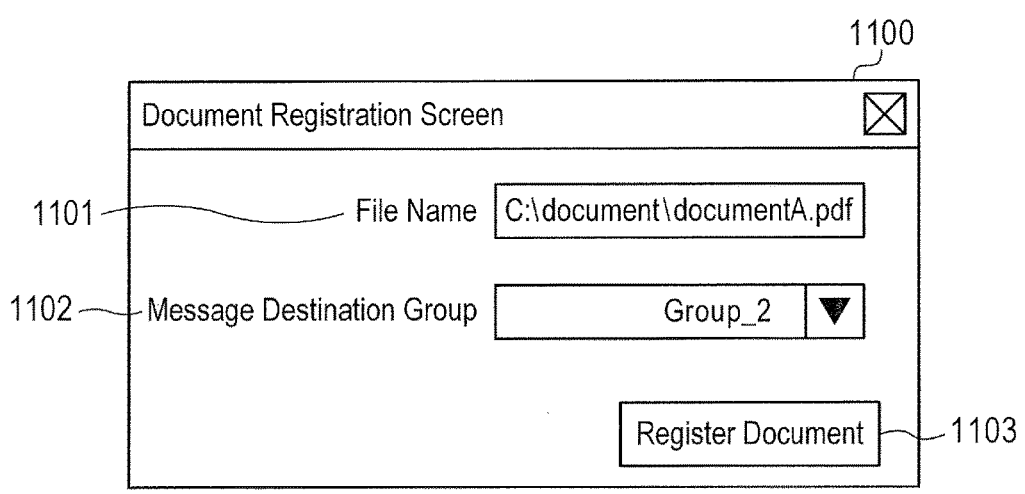
FIG. 12 is a diagram illustrating an example of a document registration screen in the case where a web browser of a client apparatus accesses the document management service and issues a document registration screen display request.
Figure 13:
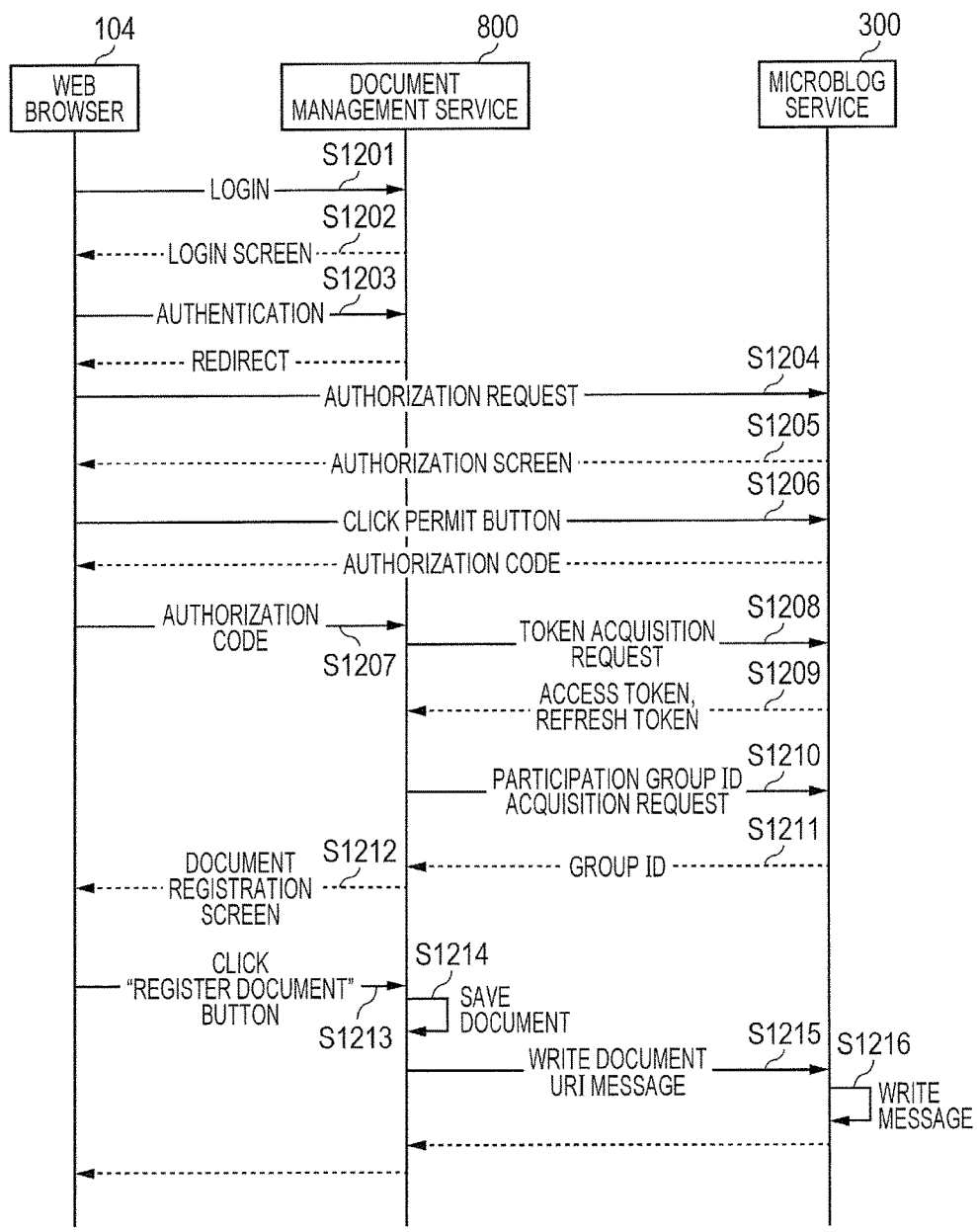
FIG. 13 is a flowchart illustrating an example of processes in the case where the document management service receives a document registration request.

Referring to FIGS. 12 and 13, a flow of a document registration process to the document management service 800 is described. FIG. 12 is a diagram illustrating an example of a document registration screen 1100 in the case where the web browser 104 of the client apparatus 101 accesses the document management service 800 and issues a document registration screen display request. The document registration screen 1100 contains a file name 1101 for designating document data to be registered, a message destination group 1102 on which the URL for accessing the registered document is posted to the microblog service, and a document registration button 1103. When the document registration button 1103 is clicked, a document registration request is issued that includes the document data designated by the file name 1101 and the destination group ID where the document URL is posted, from the client apparatus 101 to the document management service 800. The document registration screen 1100 is an example of a screen where a document to be registered and a message destination group can be selected.

FIG. 13 is a flowchart for illustrating an example of processes in the case where the document management service 800 receives a document registration request in Embodiment 1. The login processes from S1201 to S1203 are analogous to the processes having already been described in <Authentication of Document Management Service>. Accordingly, the description thereof is omitted.

In S1204, the controller 803 causes the transmitter-receiver 802 to redirect an access token acquisition request issued by the document management service 800 to the microblog service 300. The access token acquisition sequence executed from S1204 to S1209 has already been described in the foregoing <Authentication and Authorization of Microblog Service 300>. Accordingly, the description thereof is omitted. The token manager 815 stores the acquired access token as the access token 1343 in the DB 816.

In S1210, the document manager 805 of the document management service 800 transmits, to the microblog service 300, the access token 1343 acquired in S1209 and the user participation group ID acquisition request.

In S1211, the authenticator 304 of the microblog service 300 acquires the user ID 531 of a record with the matching access token 532 from the token information 530 stored in the DB 306. The authenticator 304 acquires a list of participation group IDs 507 of records with the matching user ID 531, from the acquired user information 500 stored in the DB 306. The microblog service 300 transmits the acquired list of the participation group IDs 507 to the document management service 800.

Next, in S1212, the document management service 800 sets the received participation group ID list in the message destination group 1102 on the document registration screen 1100, and transmits, to the web browser 104, the document registration screen 1100 in a manner allowing the user to select a group.

In S1213, when the user clicks the document registration button 1103 on the document registration screen 1100 displayed by the web browser 104, the document registration request including the document data and the message destination group ID is transmitted to the document management service 800.

In S1214, upon receipt of the document registration request through the transmitter-receiver 802, the controller 803 of the document management service 800 causes the document manager 805 to store the document data in the DB 807 and generates the document data information 1300. At this time, the document manager 805 stores, in the DB 807, the document ID 1311 and the destination group ID 1312 as the message information 1310.

In S1215, the message information manager 806 of the document management service 800 transmits, to the microblog service 300, a posting request to write the document data storage destination 1302 as a message, together with the access token 1343 and the destination group ID 1312.

The controller 302 of the microblog service 300 having received the posting request causes the authenticator 304 to verify whether the access token 1343 is a message writing approval access token. If the token is the message writing approval access token, the controller 302 causes the message manager 305 to write the document data storage destination 1302 as a message in the group region designated by the destination group ID 1312 (S1216).

The document registration process to the document management service 800 is thus completed. The web browser 104 is connected to the microblog service 300, and the document data storage destination 1302 described in the message is executed, thereby allowing the registered document data to be accessed. The message in which the document data storage destination 1302 is described can be accessed (viewed) only by users participating in the destination group ID 1312 designated in S1214.

<Document Access by Document Management Service 800>

Figure 14:
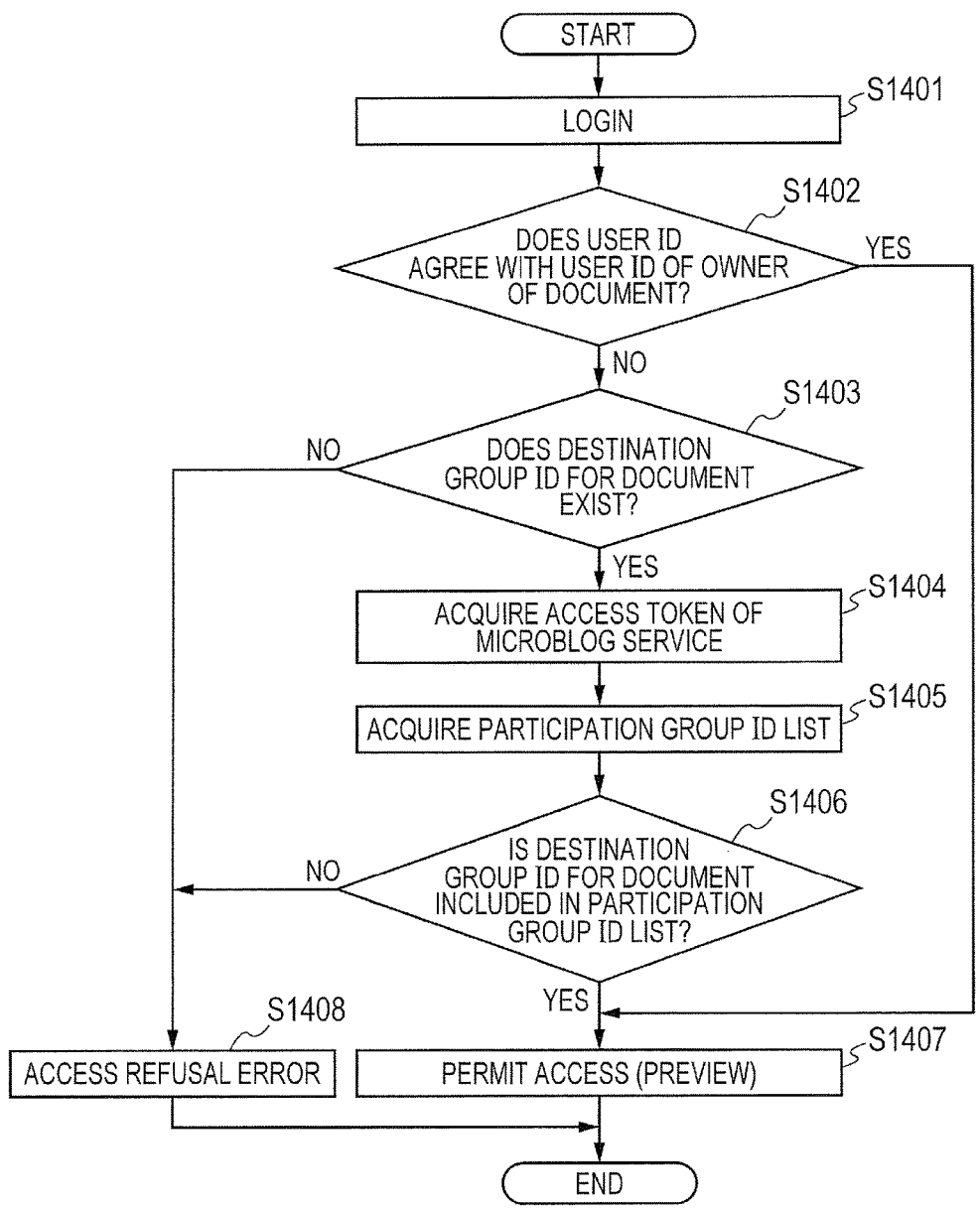
FIG. 14 is a flowchart illustrating a flow of a document access process for the document management service.

FIG. 14 is a flowchart illustrating a flow of a document access process to the document management service 800. The web browser 104 accesses the microblog service 300, and the document data storage destination 1302 displayed on the timeline screen 630 for the group is accessed, thereby starting the document access process, which is described below. That is, when the document management service 800 receives an access request through the document data storage destination 1302, the document access process is started. The document access request is an example of content control requests.

In S1401, the user logs in the document management service 800 through the web browser 104. The detailed description on the login processes are analogous to the processes having already been described in <Authentication of Document Management Service>. The description thereof is omitted.

Next, in S1402, the controller 803 causes the document manager 805 to verify whether the user ID 1303 of the document ID 1301 as the access target agrees with the user ID 1321 with which login has been made in S1401 or not. If the ID agrees, the controller 803 determines that the user having registered the document data as the access target is identical to the user having logged in the document management service 800. The controller 803 then determines that the document is accessible, and transmits the preview screen 1000 to the web browser 104 in S1407.

If the ID does not agree, the controller 803 causes the message information manager 806 to verify whether the destination group ID 1312 associated with the document ID 1311 exists or not in S1403. If the destination group ID 1312 does not exist, the controller 803 determines that the document is inaccessible in S1408, and transmits the error information indicating the inaccessibility to the web browser 104. If the destination group ID 1312 associated with the document ID 1311 exists in S1403, the controller 803 executes S1404.

In S1404, the controller 803 causes the token manager 815 of the authentication service 811 to acquire the access token 1343 to the microblog service for the user having logged in the document management service 800. At this time, if the access token 1343 does not exist, the controller 813 causes the token manager 815 to transmit the access token acquisition request to the microblog service 300. The details of the access token acquisition process have already been described in the foregoing <Authentication and Authorization of Microblog Service 300>. Accordingly, the description thereof is omitted.

In S1405, the controller 803 causes the transmitter-receiver 802 to transmit, to the microblog service 300, the participation group ID acquisition request together with the access token 1343. The microblog service 300 having received the participation group ID acquisition request transmits, to the controller 803, the user participation group ID list of the microblog service 300 matching concerning the access token.

In S1406, the controller 803 determines whether the acquired participation group ID list includes the destination group ID 1312 acquired in S1403 or not. If the ID is included, the controller determines positive accessibility, and the controller 803 causes the page generator 804 to transmit the preview screen 1000 to the web browser 104 in S1407. If the participation group ID list acquired in S1406 does not include the destination group ID 1312 acquired in S1403, the controller 803 determines inaccessibility, and executes S1408.

The document access process in the document management service 800 is thus completed.

According to the document registration and the document access process of this embodiment, in each of the case of document registration and the case where the user accesses the document, an API call for acquiring the participation group ID list to the microblog service 300 is executed only one time.

Embodiment 2

In this embodiment, a method is described of posting, as a message, an URL allowing the multiple microblog services to access the document to groups intended to share the document and of controlling access to the document.

It is hereinafter assumed that multiple microblog services 300 are microblog services A and B. Description on the details having already been described in Embodiment is omitted. In the case where the same symbols are assigned, the processes are determined as the same and the description thereof is omitted, which is analogous in the following embodiments.

Figure 15:
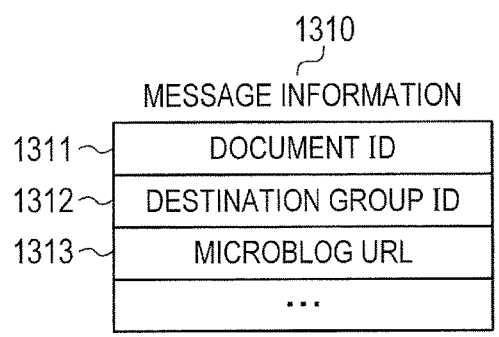
FIG. 15 is a diagram illustrating an example of a data structure of message information in Embodiment 2.

FIG. 15 is a diagram illustrating an example of a data structure of the message information 1310 in Embodiment 2. A microblog URL 1313 is an URL for access to the microblog service 300. For instance, the endpoint URL for the web service of the microblog service 300 is stored. The microblog URL 1313 corresponds to the microblog URL 1342 of the microblog access token information 1340.

Figure 16:
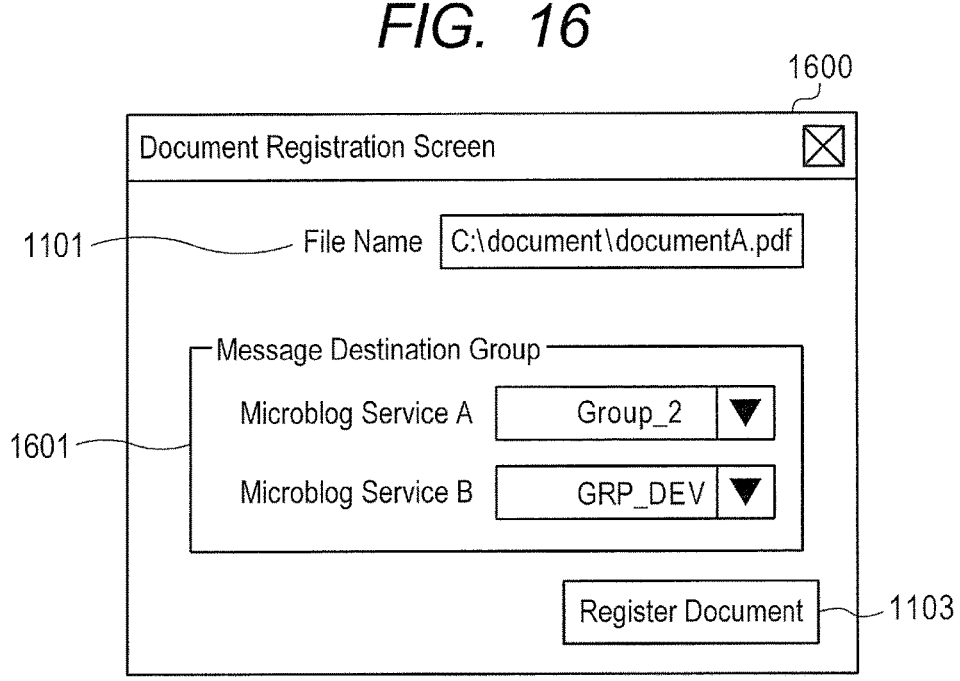
FIG. 16 is a diagram illustrating an example of a document registration screen in Embodiment 2.

FIG. 16 is a diagram illustrating an example of a document registration screen 1600 in Embodiment 2. The document registration screen 1600 contains a message destination group 1601 on which the URL for accessing the registered document is posted to the microblog services A and B.

Figure 17:
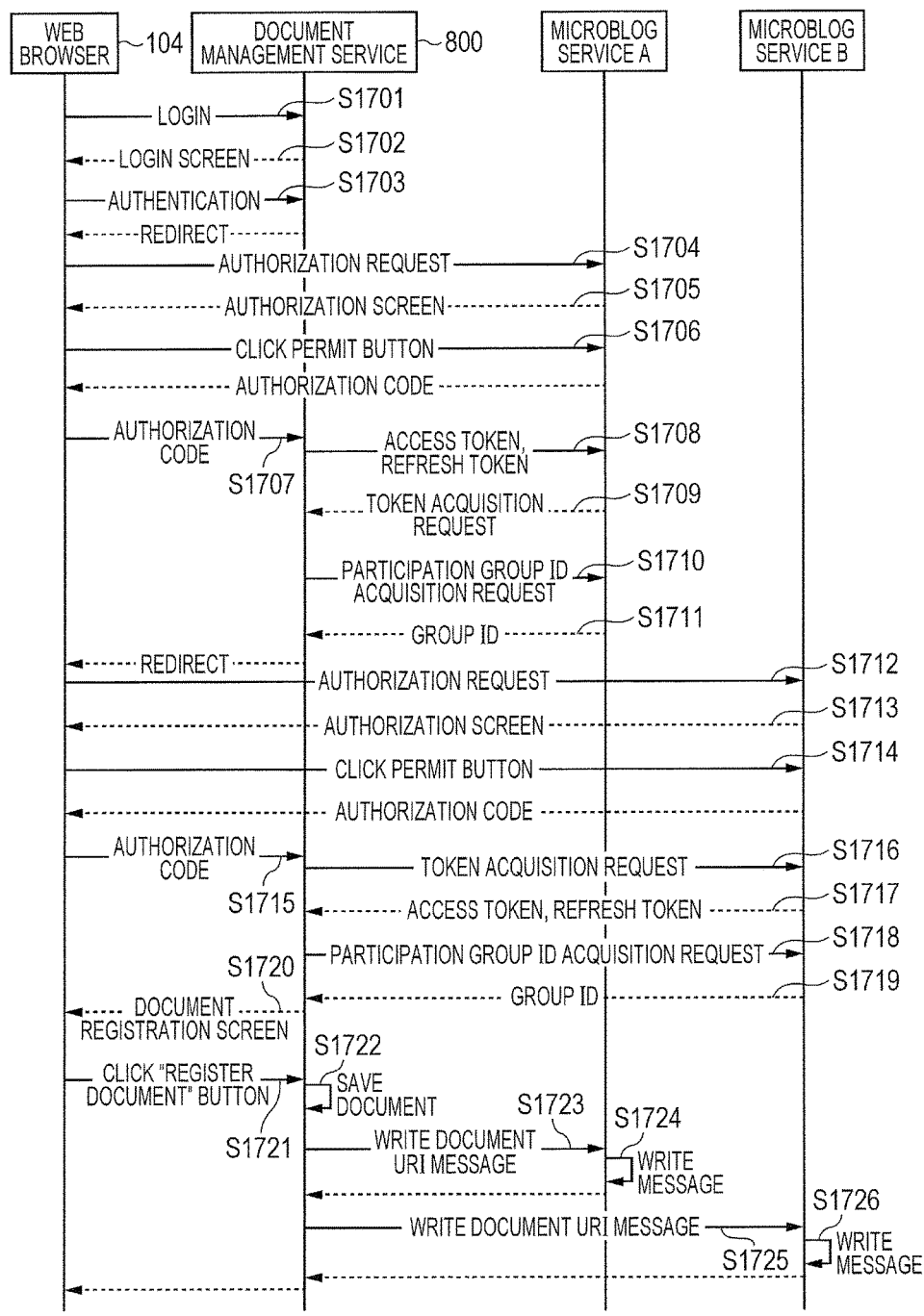
FIG. 17 is a flowchart illustrating an example of a process in the case where the document management service receives a document registration request in Embodiment 2.

FIG. 17 is a flowchart illustrating an example of processes in the case where the document management service 800 in Embodiment 2 receives a document registration request. The login processes from S1701 to S1703 are analogous to the processes having already been described in <Authentication of Document Management Service>. Accordingly, the description thereof is omitted.

Processes S1704 to S1711 and S1712 to S1719 allow the document management service 800 to acquire the access token and the participation group ID list from each of the microblog services A and B. The processes are analogous to the processes S1204 to S1211. Accordingly, the description thereof is omitted.

Next, in S1720, the document management service 800 sets the received participation group ID list in the message destination group 1601 on the document registration screen 1600 for allowing the user to perform selection, and transmits to the web browser 104, the document registration screen 1600 in a manner allowing the user to select a group.

The user clicks the document registration button 1103 on the document registration screen 1600 displayed by the web browser 104. In S1721, the document registration request including the document data and the message destination group ID is then transmitted from the web browser 104 to the document management service 800.

In S1722, when the controller 803 of the document management service 800 receives the document registration request through the transmitter-receiver 802, this controller causes the document manager 805 to store the document data in the DB 807 and generates the document data information 1300. At this time, the document manager 805 stores, in the DB 807, the document ID 1311, the destination group ID 1312 and the microblog URL 1313 as the message information 1310 concerning each of the microblog services A and B.

In S1723, the message information manager 806 of the document management service 800 transmits, to the microblog service A, a posting request for writing the document data storage destination 1302 as a message, together with the access token 1343 and the destination group ID 1312.

The controller 302 of the microblog service A having received the posting request causes the authenticator 304 to verify whether the access token 1343 is an writing approval access token. If the token is the message writing approval access token, the controller 302 causes the message manager 305 to write the document data storage destination 1302 as a message in the group region designated by the destination group ID 1312 (S1724). Processes S1725 and S1726 are processes where S1723 and S1724 are executed for the microblog service B. The description thereof is omitted for the sake of simplification.

The document registration process to the document management service 800 in Embodiment 2 is thus completed.

Figure 18:
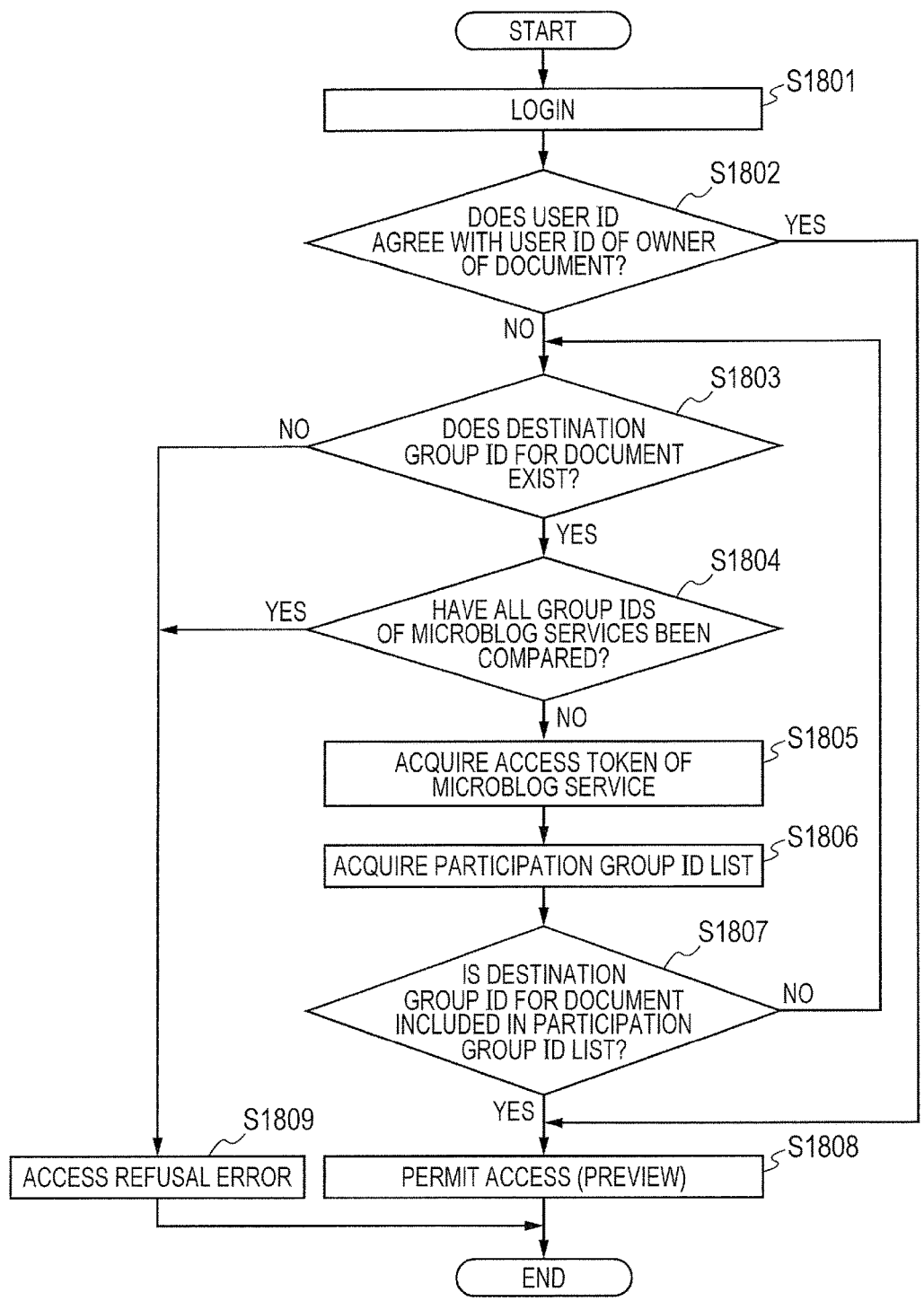
FIG. 18 is a flowchart illustrating a flow of a document access process for a document management service in Embodiment 2.

FIG. 18 is a flowchart illustrating a flow of a document access process to the document management service 800 in Embodiment 2. Access from the web browser 104 to one of the microblog service A and B and access to the document data storage destination 1302 displayed on the timeline screen 630 for the group start the document access process, which is described below.

Processes in S1801 to S1803 are analogous to the processes described with reference to S1401 to S1403. Accordingly, the description thereof is omitted. Processes S1806, S1808 and S1809 are analogous to the processes described with reference to S1405, S1407 and S1408. Accordingly, the description thereof is omitted.

In S1804, the controller 803 of the document management service 800 causes the message information manager 806 to acquire the destination group ID 1312 having the ID matching with the document ID 1311, and the microblog URL 1313, from the message information 1310. If comparison is performed for the destination group IDs 1312 of all records of the acquired message information 1310, the controller 803 executes S1809. Here, the comparison is processes S1805 to S1807, which are described later.

If a record having not been compared yet exists, the controller 803 transmits the access token acquisition request to the microblog URL 1313 of the record in S1805. The details of the processes are analogous to the processes having already been described in S1404. Accordingly, the description thereof is omitted.

In S1807, the controller 803 verifies whether or not the participation group ID list acquired in S1406 includes the destination group ID 1312 of a record whose microblog URL 1342 agrees with the microblog URL 1313 used in S1805. If the ID is included, the controller 803 determines positive accessibility and causes the page generator 804 to transmit the preview screen 1000 to the web browser 104 in S1808. The document access process to the document management service 800 in Embodiment 2 is thus completed.

Embodiment 3

In this embodiment, a method is described that posts a message to groups where an URL for accessing a document is intended to be shared in the multiple microblog services, and controls access to the document. It is hereinafter assumed that multiple microblog services 300 are microblog services A and B, and the embodiment is described.

Figures 19, 20:
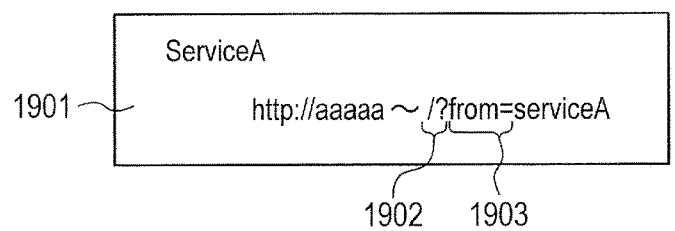
FIG. 19 is a diagram illustrating an example of a table representing correspondence between microblog identifiers and microblog URLs in Embodiment 3.
FIG. 20 is a diagram illustrating an example of a combined URL generated by a message information manager.

The data structure of the message information 1310 in Embodiment 3 is analogous to the structure in FIG. 15. FIG. 19 is a diagram illustrating an example of a table representing correspondence between a microblog identifier 2002 and a microblog URL 1313 in Embodiment 3. At the start of using the document sharing service 801, the user of the document management service 800 preliminarily operates a microblog URL setting screen, not illustrated. This operation thus instructs creation of a correspondence table 2001, and the message information manager 806 stores the correspondence table 2001 in the DB 807.

The document registration screen in Embodiment 3 is analogous to the screen in FIG. 16. The microblog identifier 2002 described in the correspondence table 2001 is displayed as a candidate for the message destination group (microblog services A and B in the example in FIG. 16).

Processes of the document management service 800 upon receipt of the document registration request in Embodiment 3 are described with reference to FIG. 17. Processes different from the processes in Embodiment 2 are S1723, S1724, S1725 and S1726.

In S1723, the message information manager 806 of the document management service 800 transmits, to the microblog service A, a posting request for writing a combined URL 1901 as a message, together with the access token 1343 and the destination group ID 1312. Here, the message information manager 806 refers to the correspondence table 2001 stored in the DB 807 and combines the microblog identifier 2002 corresponding to the microblog URL 1313 with the document data storage destination 1302, thereby generating the combined URL 1901. The microblog identifier 2002 is an example of identification information for accessing the posting management service.

FIG. 20 is a diagram illustrating an example of the combined URL 1901 generated by the message information manager 806. The message information manager 806 concatenates the document data storage destination 1302 to the microblog identifier 2002 with a separator character string 1902 that delimits a URL and a parameter and a parameter character string 1903 capable of being analyzed by the controller 803. Thus, the message information manager 806 generates the combined URL 1901.

The description is returned to that with reference to FIG. 17. The controller 302 of the microblog service A having received the posting request causes the authenticator 304 to verify whether the access token 1343 is a message writing approval access token. If the token is a message writing approval access token, the controller 302 of the microblog service A advances the process to S1724. In S1724, the controller 302 of the microblog service A causes the message manager 305 to write the combined URL 1901 as a message in the group region designated by the destination group ID 1312.

S1725 and S1726 are processes where S1723 and S1724 are executed for the microblog service B, and analogous to the processes of S1723 and S1724. Accordingly the description thereof is omitted. Thus, the document registration process to the document management service 800 in Embodiment 3 is completed.

Figure 21:
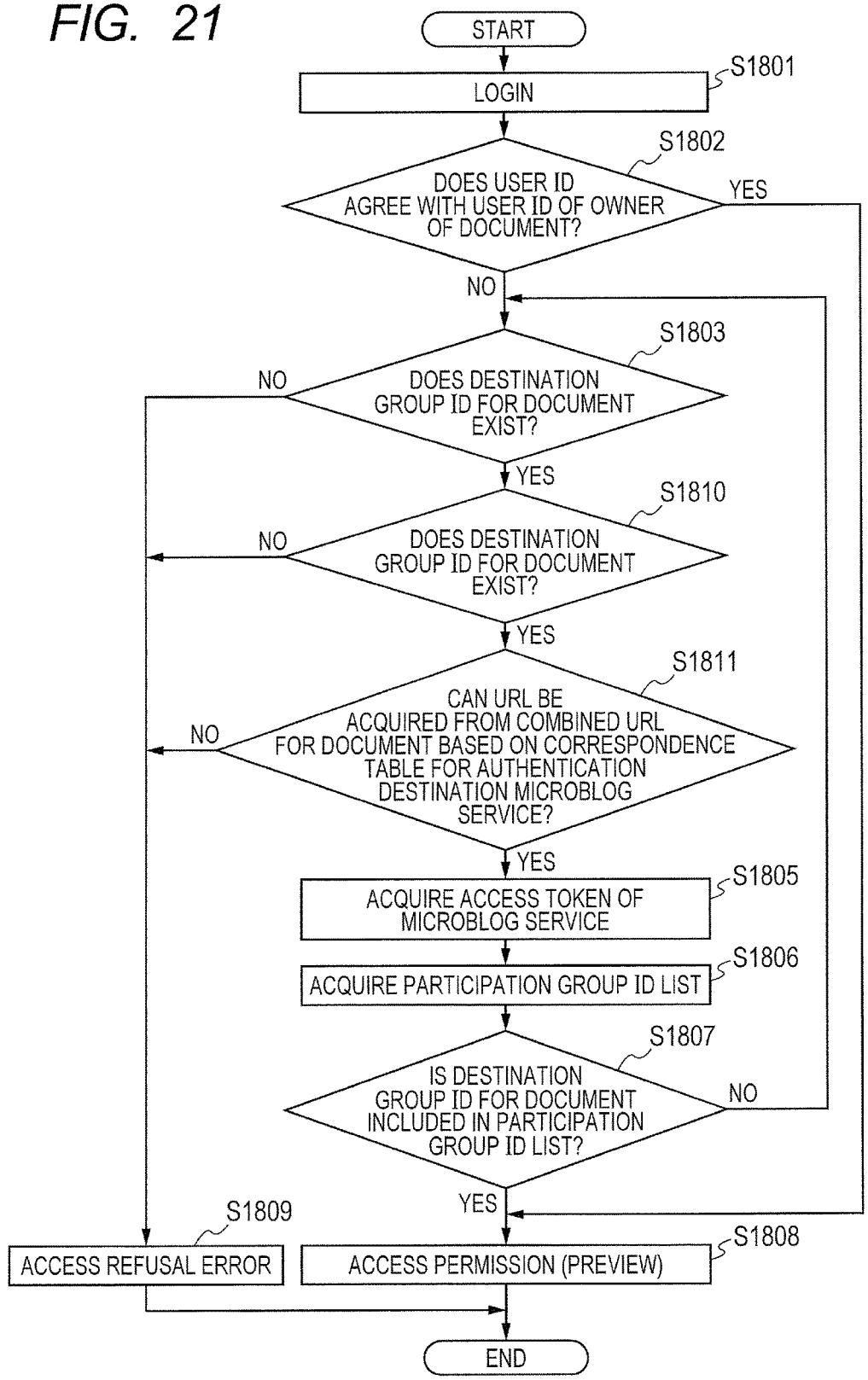
FIG. 21 is a flowchart illustrating an example of a flow of a document access process to a document management service in Embodiment 3.

FIG. 21 is a flowchart illustrating an example of a flow of the document access process to the document management service 800 in Embodiment 3. Access from the web browser 104 to one of the microblog services A and B and access to the document data storage destination 1302 displayed on the timeline screen 630 for the group start the document access process, which is described below. Hereinafter, points different from those in FIG. 18 are mainly described.

In S1810, the controller 803 of the document management service 800 causes the message information manager 806 to acquire the destination group ID 1312 having the ID matching with document ID 1311, and the microblog URL 1313, from the message information 1310.

In S1811, the controller 803 identifies the microblog URL as the authentication destination, based on the combined URL 1901 and the correspondence table 2001. If the matching microblog URL exists among microblog URLs 1313 described in the message information 1310, the controller 803 regards this microblog URL as the authentication destination. If no microblog URL can be identified or match, the controller 803 executes S1809.

In S1805, the controller 803 transmits an access token acquisition request to the microblog URL 1313. The details of this process has already been described in S1404. Accordingly, the description thereof is omitted. The document access process to the document management service 800 in Embodiment 3 is thus completed.

As described above, in this embodiment, the microblog service to be cooperated with in the case of referring to each document can be identified. Accordingly, only one time of authentication for viewing a document is required. Thus, efforts for the authentication process are reduced, and the number of API calls can be reduced.

Embodiment 4

In the foregoing embodiments, description has been made exemplifying access control as examples of control on documents. The control is not limited thereto, and is also applicable to control of updating a document.

Figure 22:
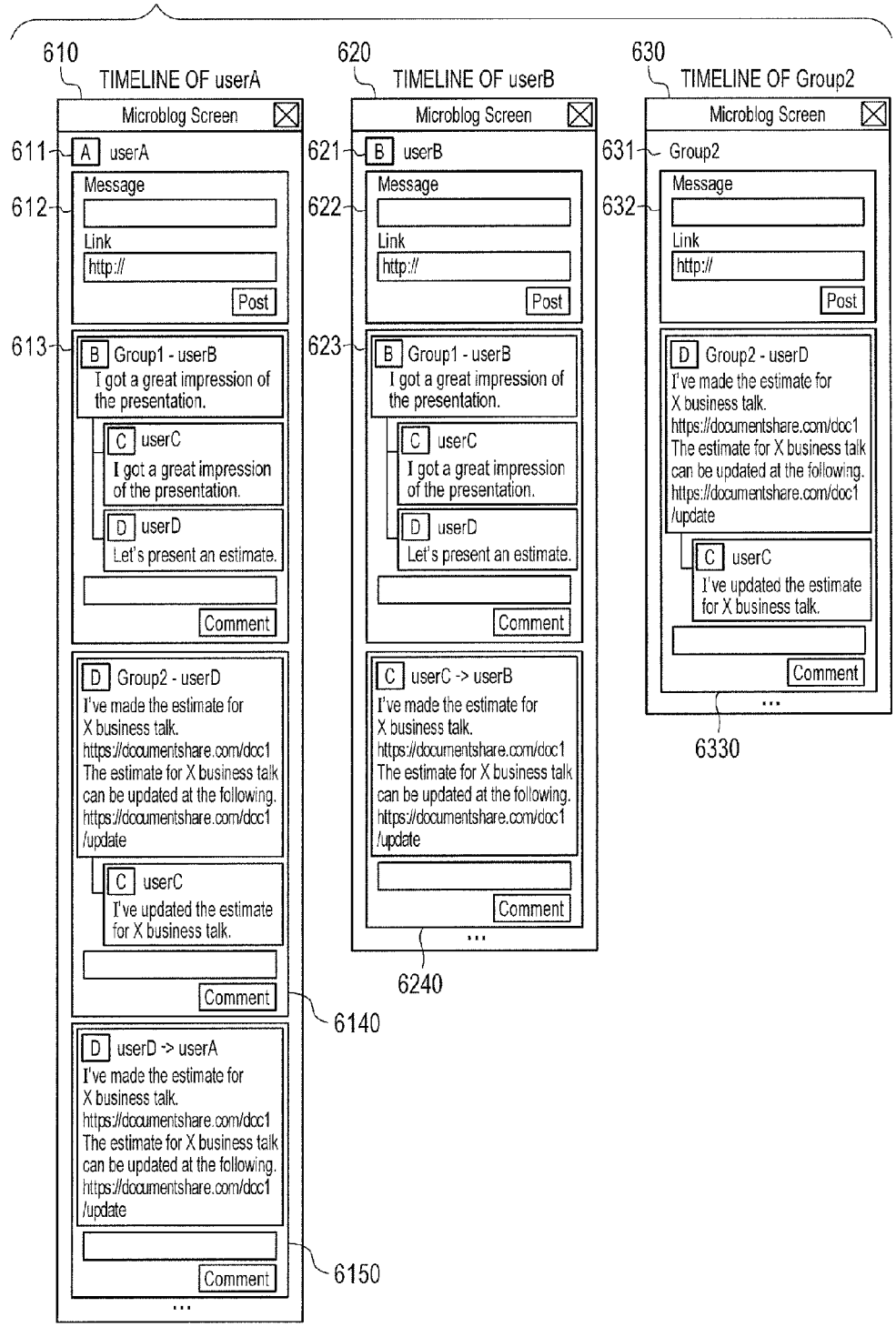
FIG. 22 is a diagram illustrating an example of timeline screens in Embodiment 4.

FIG. 22 is a diagram illustrating an example of a timeline screen in Embodiment 4. With reference to FIG. 22, points different from those in FIG. 7 are mainly described.

A comment posting region 6140 is for a message and a link posted by the userD to the Group2. In this example, a comment by the UserC to the post is displayed. In a comment posting region 6150, the message and the link posted by the userD to the userA are displayed as an example. In a comment posting region 6240, the message and the link posted by the userC to the userB are displayed as an example. A comment posting region 6330 is analogous to the message posting regions (613, 6140, 6150, 623 and 6240) on the timeline screen of the user.

If the authentication token is valid, the controller 803 of this embodiment generates the preview screen 1000 and returns this screen or generates an after-mentioned document update screen 2700 and returns the screen, in response to the request.

Figure 23:
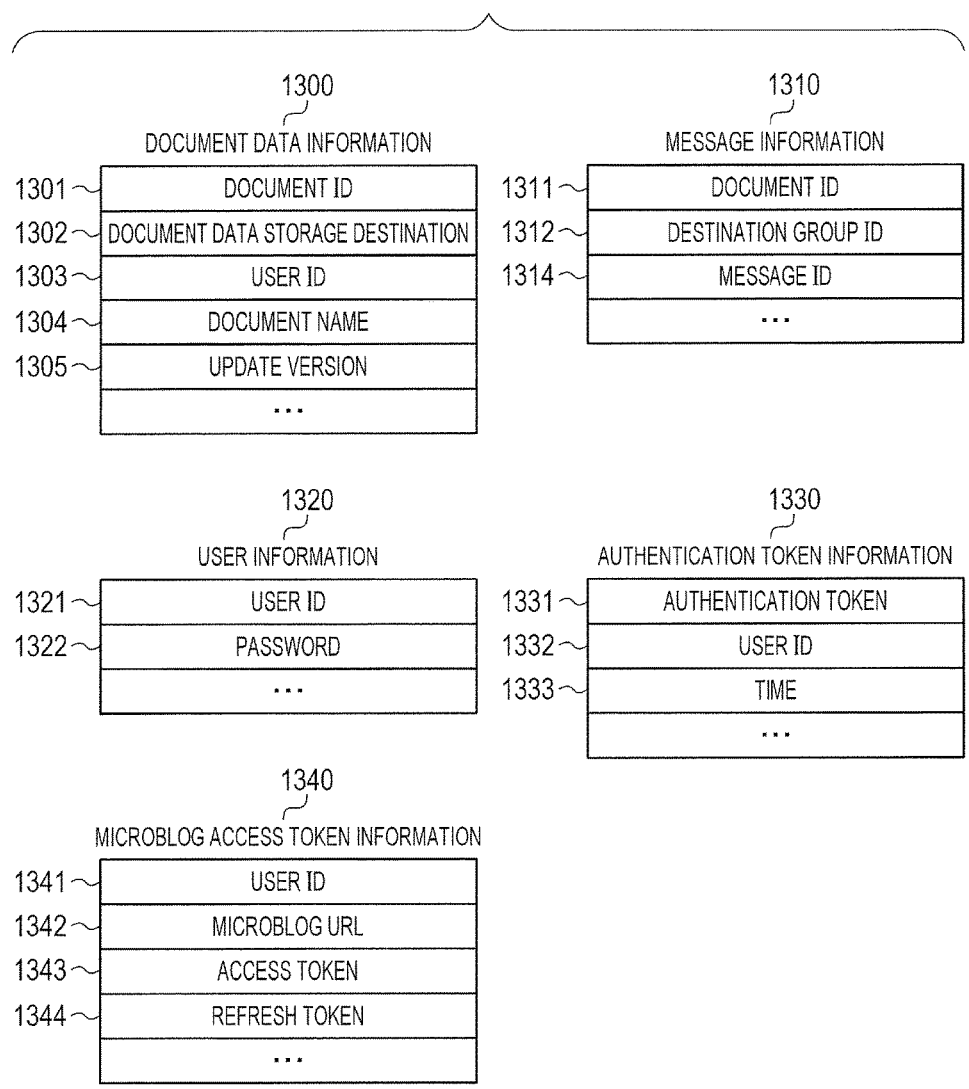
FIG. 23 is a diagram illustrating examples of document data information, message information, user information and authentication token information managed on a document management service and an authentication service that are included in a document sharing service in Embodiment 4.

FIG. 23 is a diagram illustrating examples of the document data information 1300, the message information, the user information 1320 and the authentication token information 1330 that are included in the document management service 800 in Embodiment 4 and managed on the document sharing service 801 and the authentication service 811.

The document data information 1300 of this Embodiment 4 is additional information on document data, and includes a document ID 1301, a document data storage destination 1302, a user ID 1303, a document name 1304 and an update version 1305. The update version 1305 is the update version of the document. The version is incremented each time of updating the document.

Figure 24:
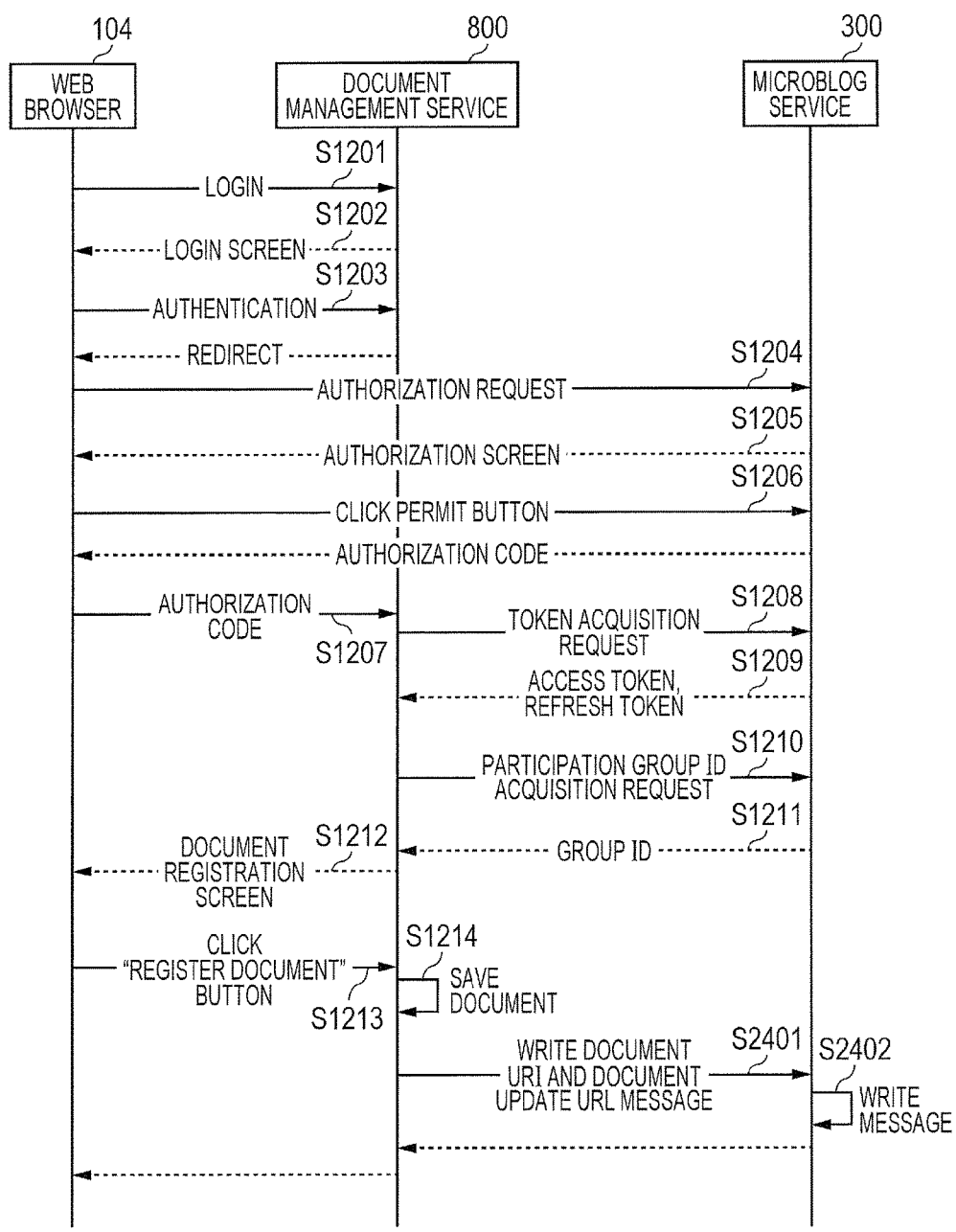
FIG. 24 is a flowchart illustrating an example of processes where the document management service receives a document registration request in Embodiment 4.

FIG. 24 is a flowchart illustrating an example of processes in the case where the document management service 800 in Embodiment 4 receives a document registration request.

In S2401, the message information manager 806 transmits, to the microblog service 300, a posting request for writing the access token 1343, the destination group ID 1312, the document data storage destination 1302 and the document data update request information as a message. The document data update request information is a URL-formed request for updating the document data at the document data storage destination 1302. This URL includes the document ID 1301. The controller 302 of the microblog service 300 having received the posting request causes the authenticator 304 to verify whether the access token 1343 is a message writing approval access token. If the token is the message writing approval access token, the controller 302 advances the process to S2402. In S2402, the controller 302 causes the message manager 305 to write the document data storage destination 1302 and the document data update request information as a message in the group region designated by the destination group ID 1312. The message information manager 806 of the document management service 800 stores the message ID 701 returned from the microblog service 300 in the message information 1310 as the message ID 1314.

Figure 25:
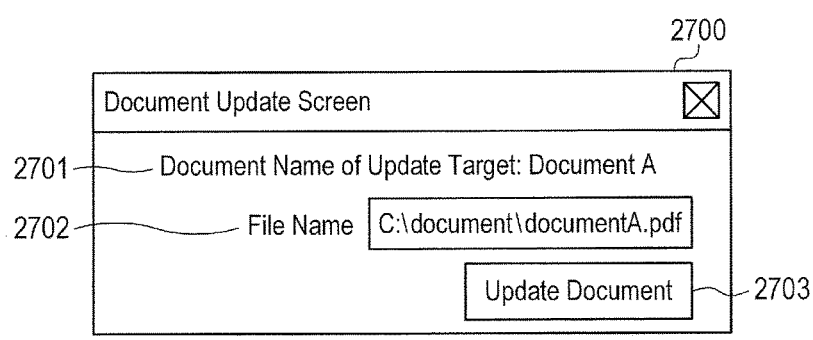
FIG. 25 is a diagram illustrating an example of a document update screen in the case where a web browser of a client apparatus accesses a document management service and issues a document update screen display request.

FIG. 25 is a diagram illustrating an example of a document update screen 2700 in the case where the web browser 104 of the client apparatus 101 accesses the document management service 800 to issue a document update screen display request. When a document update screen display request including information for identifying a document is issued from the web browser 104 to the document sharing service 801, the document management service 800 generates the document update screen 2700 including the information for identifying the document, and returns the screen to the web browser 104. The information for identifying the document is the document ID 1301. The document update screen 2700 contains a document name 2701 of an update target, a file name 2702 for designating document data to be updated, and a document update button 2703 for transmitting a request to execute document update. The document name 2701 as the update target is information stored in the document name 1304 of the document data information 1300. Clicking the document update button 2703 issues a request to update a document together with the document data designated by the file name 2702 and the document ID 1301 from the client apparatus 101 to the document management service 800.

Figure 26:
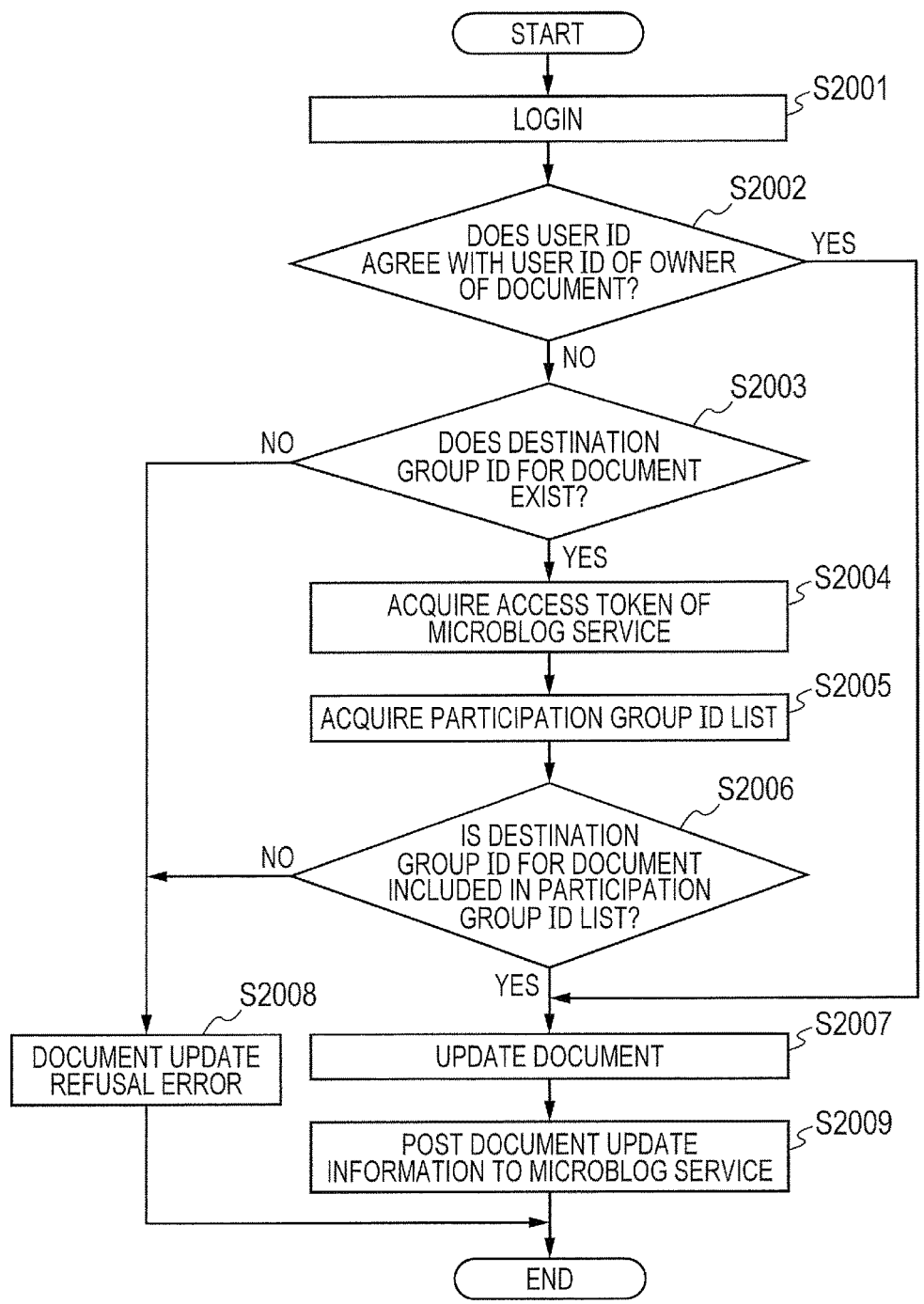
FIG. 26 is a flowchart illustrating an example of processes in the case where the document management service receives a document update request.

FIG. 26 is a flowchart illustrating an example of processes in the case where the document management service 800 receives a document update request. In S2001, the user logs in the document management service 800. The details of the login process are analogous to the details of the process having already been described in <Authentication of Document Management Service>. Accordingly, the description thereof is omitted.

Next, in S2002, the controller 803 causes the document manager 805 to verify whether the user ID 1303 of the document ID 1301 as the access target agrees with the user ID 1321 with which login has been made in S2001 or not. If the ID agrees, the controller 803 determines that the user having registered the document data as the update target is identical to the user having logged in the document management service 800, determines that the document can be updated, and updates the document in S2007. The document update process is described later. If the ID does not agree, the controller 803 causes the message information manager 806 to verify whether the destination group ID 1312 associated with the document ID 1311 exists or not in S2003. If the destination group ID 1312 does not exist, the controller 803 determines that the document cannot be updated in S2008, and transmits error information representing the incapability to the web browser 104.

In S2003, if the destination group ID 1312 associated with the document ID 1311 exists, the controller 803 executes S2004. In S2004, the controller 803 acquires the access token 1343 to the microblog service for the user having logged in the document management service 800, through the token manager 815 of the authentication service 811. At this time, if the access token 1343 does not exist, the controller 813 causes the token manager 815 to transmit an access token acquisition request to the microblog service 300. The details of the access token acquisition process are analogous to the details having already been described in the foregoing <Authentication and Authorization of Microblog Service 300>. Accordingly, the description thereof is omitted.

In S2005, the controller 803 causes the transmitter-receiver 802 to transmit, to the microblog service 300, a participation group ID acquisition request together with the access token 1343. The microblog service 300 having received the participation group ID acquisition request transmits, to the controller 803, the user participation group ID list of the microblog service 300 with the matching access token.

In S2006, the controller 803 determines whether the acquired participation group ID list includes the destination group ID 1312 acquired in S2003 or not. If the ID is included, the controller 803 determines that the document can be updated and updates the document in S2007.

In the document update process of S2007, the controller 803 causes the document manager 805 to store, in the DB 807, the document data received through the transmitter-receiver 802 from the web browser 104. At this time, the document manager 805 stores the document data in the document data storage destination 1302 that is in the DB 807 and associated with the document ID 1301 received from the web browser 104 through the transmitter-receiver 802. Furthermore, the document manager 805 increments the update version 1305 of the document data information 1300.

In S2009, the message information manager 806 transmits, to the microblog service 300, a posting request for writing the document update information as a comment to the message ID 1314 together with the access token 1343 and the destination group ID 1312. Update information includes the document name of the updated document data. The document update process in the document management service 800 is thus completed.

According to the document registration, the document access process and the document update process in this Embodiment 4, only one time of an API call for acquiring the participation group ID list to the microblog service 300 is executed in each of the case of document registration, the case of document access by the user, and the case of document update.

Embodiment 5

Figure 27:
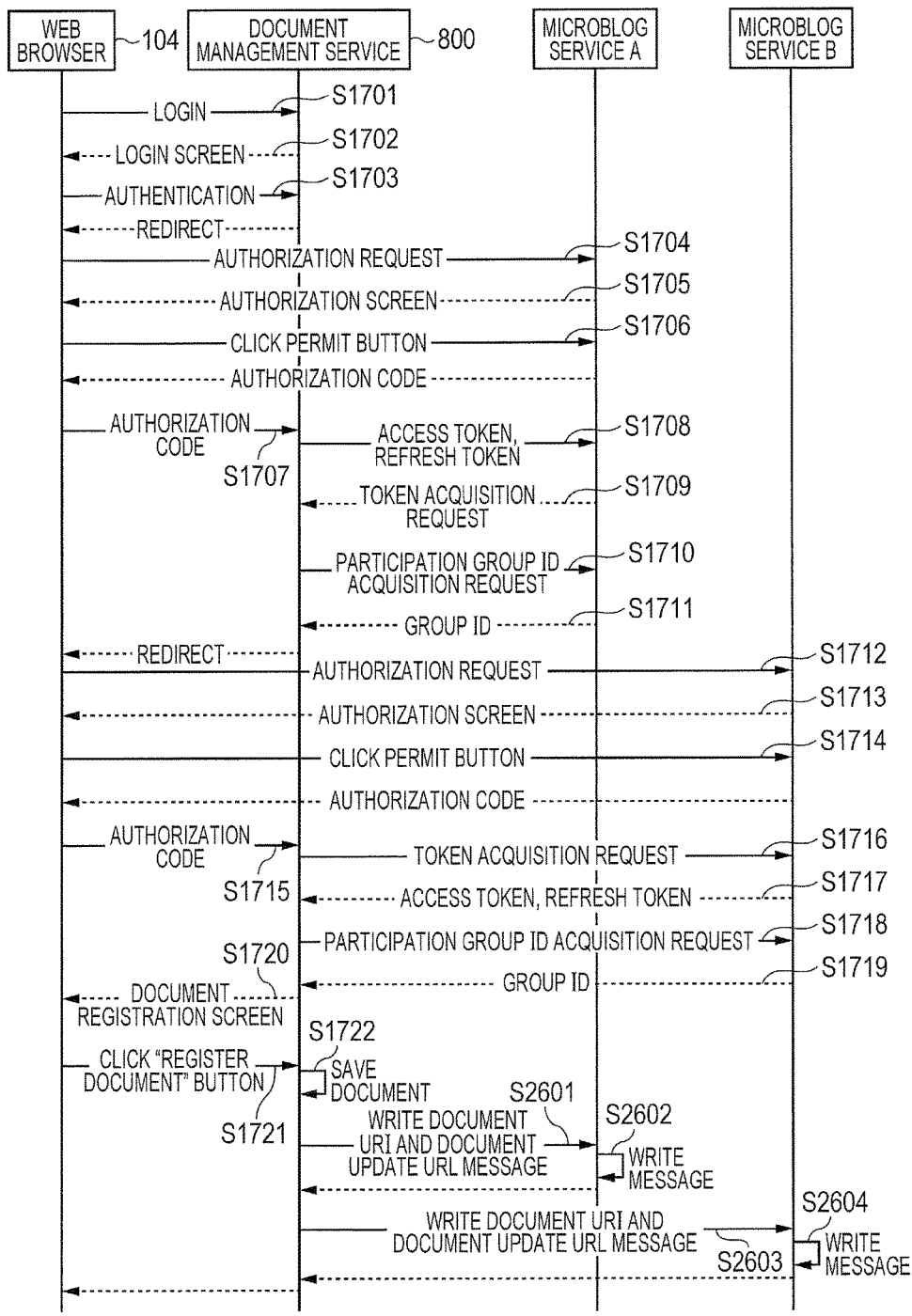
FIG. 27 is a flowchart illustrating an example of processes in the case where a document management service receives a document registration request in Embodiment 5.

An example where Embodiment 4 is applied to Embodiment 2 is described below. FIG. 27 is a flowchart illustrating an example of processes in the case where the document management service 800 in Embodiment 5 receives a document registration request.

In S2601, the message information manager 806 transmits, to the microblog service A, a posting request for writing an access token 1343, a destination group ID 1312, a document data storage destination 1302 and document data update request information as a message. The controller 302 of the microblog service A having received the posting request causes the authenticator 304 to verify whether the access token 1343 is the message writing approval access token. If the token is the message writing approval access token, the controller 302 executes the process of S2602. In S2602, the controller 302 causes the message manager 305 to write the document data storage destination 1302 and the document data update request information as a message in the group region designated by the destination group ID 1312. S2603 and S2604 are processes where S2601 and S2602 are executed in the microblog service B. Accordingly, the description thereof is omitted for the sake of simplification.

Embodiment 6

If the user having registered the document withdraws participation from the destination group ID 1312 designated when the document is registered, document update by the user having registered the document prevents document update information for the destination group ID 1312 from being posted in S2009 and, in turn, prevents the document update information from being shared in the group. In this embodiment, a method is described where, if the user having registered the document withdraws participation from the destination group ID 1312 designated when the document is registered, the document is not updated and change in document owner is suggested to the user having registered the document.

Figure 28:
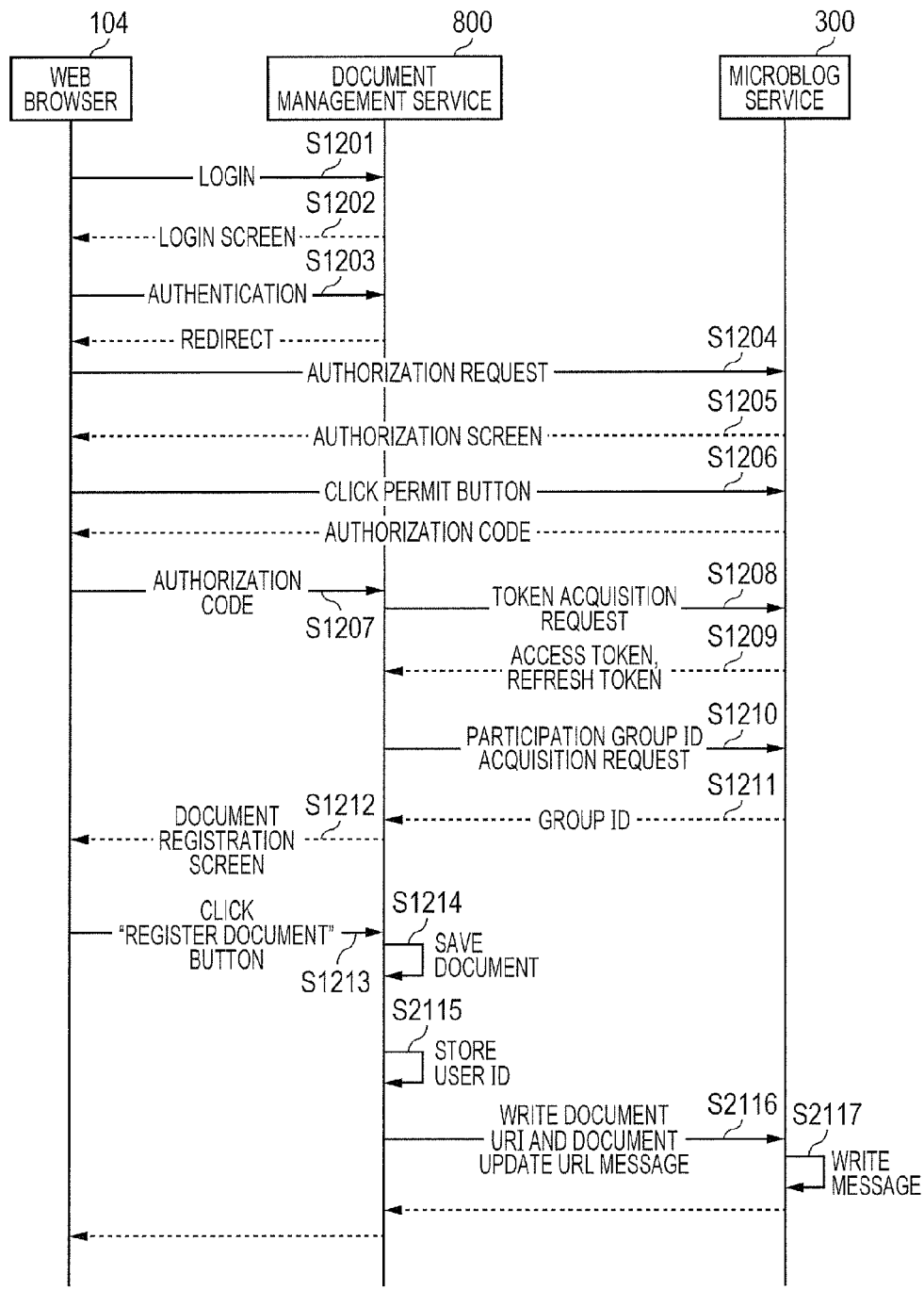
FIG. 28 is a flowchart illustrating an example of processes in the case where the document management service receives the document registration request in Embodiment 6.

FIG. 28 is a flowchart illustrating an example of processes in the case where the document management service 800 receives the document registration request in Embodiment 6.

Figure 29:
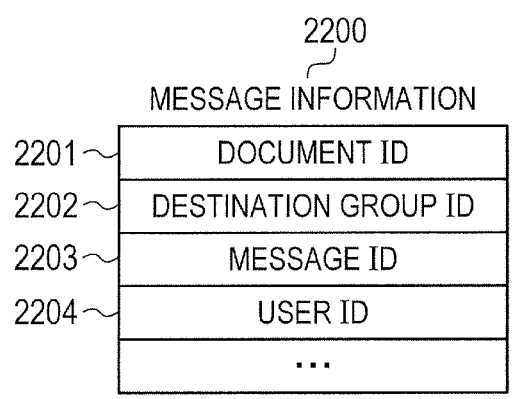
FIG. 29 is a diagram illustrating an example of message information held by the document management service.

In S2115, the message information manager 806 of the document management service 800 stores the user ID 1341 of the microblog access token information 1340 acquired in S2109, into the user ID 2204 of the message information 2200 in FIG. 29. Here, FIG. 29 is a diagram illustrating an example of message information 2200 stored in the document management service 800. The pieces of information 2201 to 2203 in the message information 2200 are equivalent to the pieces of information 1310 to 1313.

In S2116, the message information manager 806 transmits, to the microblog service 300, a posting request for writing the access token 1343, the destination group ID 1312, the document data storage destination 1302 and the document data update request information as a message.

Figure 30:
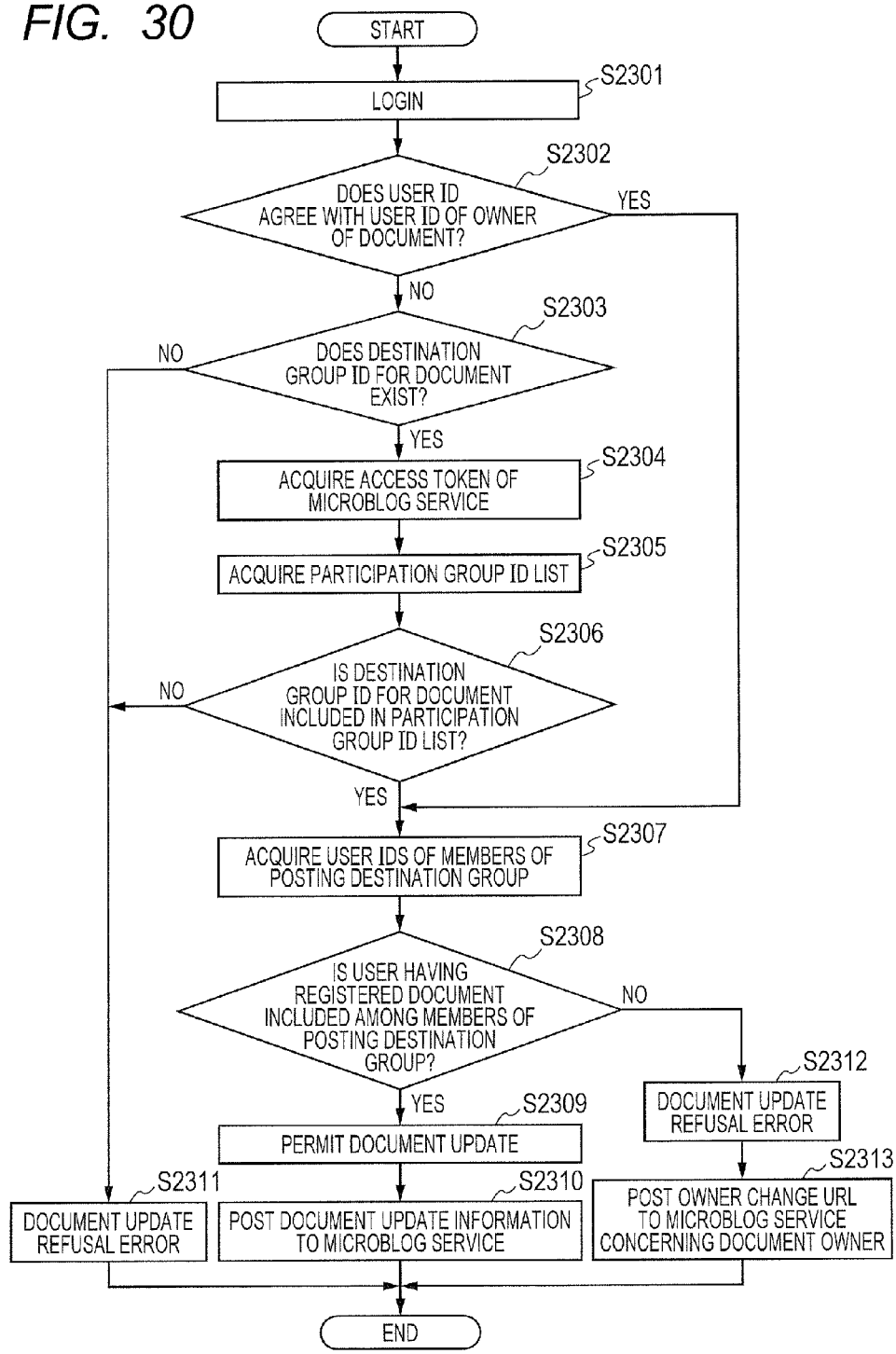
FIG. 30 is a flowchart illustrating an example of a flow of a document update process to a document management service in Embodiment 6.

FIG. 30 is a flowchart illustrating an example of a flow of a document update process to the document management service 800 in Embodiment 6. Access from the web browser 104 to the microblog service and access to request information for updating document data displayed on the timeline screen 630 for the group start a document update process, which is described below. That is, upon receipt of a request to update a document through request information for updating document data, the document management service 800 starts the document update process. The request to update the document is an example of the content control request.

The detailed description on processes S2301 to S2306 and S2311 is analogous to that of the processes having been described S2001 to S2006 and S2008. Accordingly, the description thereof is omitted.

S2307 is a process where the document management service 800 acquires the access token and the participation group ID list from the microblog service 300. In S2307, the controller 803 causes the transmitter-receiver 802 to transmit, to the microblog service 300, a request to acquire the user ID list of the user participating in the destination group ID together with the access token 1343 and the destination group ID 1312. The microblog service 300 having received a request to acquire the participating user ID list transmits, to the controller 803, the participating user ID list in the microblog service 300 with the matching designated group ID.

In S2308, the controller 803 verifies whether or not the acquired participating user ID list includes a user ID matching with the user ID 2204 of the user having registered the document. If no matching user ID exists, the controller 803 causes the page generator 804 of the document management service 800 to generate an update error and return the error screen to the web browser 104 in S2312.

In S2313, the message information manager 806 of the document management service 800 transmits, to the microblog service 300, a posting request to write the access token 1343, the user ID 2204 and document owner changing request information as a message. This process is an example of processes of transmitting the posting request. Here, the user ID 2204 is the user ID of the user having registered the document. The document owner changing request is displayed as a message on the timeline screen 630 for the user having registered the document.

If the user ID agreeing with the user ID 2204 exists in S2308, the controller 803 of the document management service 800 performs the document update process in S2309. The document update process is analogous to the process having been described in S2007. Accordingly, the description thereof is omitted.

In S2310, the message information manager 806 transmits, to the microblog service 300, a posting request to write the access token 1343, the destination group ID 1312 and the document update information as a comment to the message ID 1314. The update information includes the document name of the updated document data.

Figure 31:
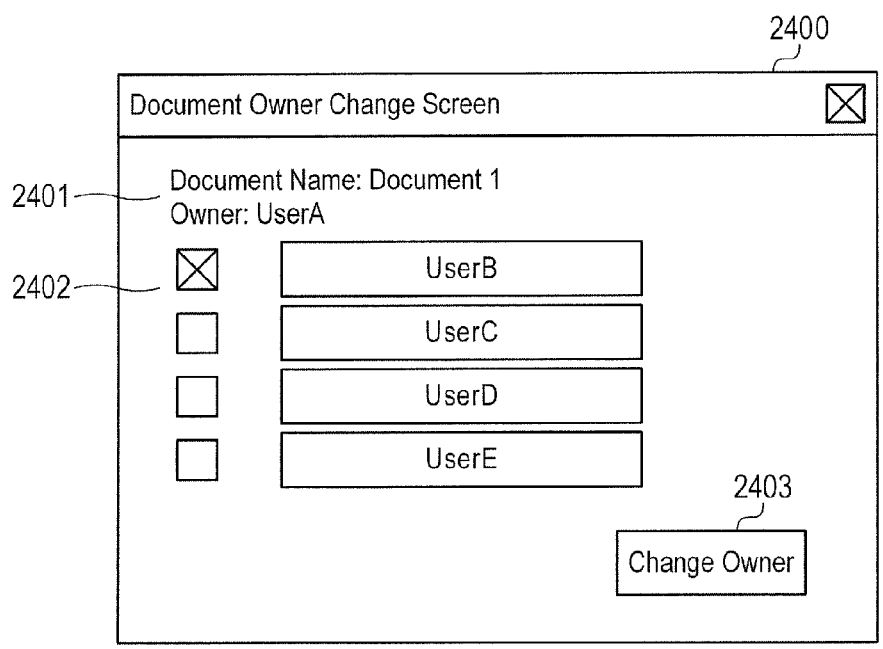
FIG. 31 is a diagram illustrating an example of a document owner changing screen.

FIG. 31 is a diagram illustrating an example of a document owner changing screen 2400. The party having registered the document accesses the owner changing request displayed on the timeline screen 630 of the microblog service 300 for the party, thereby allowing the document management service 800 to generate this screen, which is displayed by the web browser 104.

Items 2401 represent the document name 1304 of the document data as an owner change target, and the user ID 1303 of the owner. The change destination user list 2402 is a participating user ID list acquired from the microblog service 300 by the document management service 800 in S2307. The owner change button 2403 is clicked, and the owner changing request together with the user ID selected from the participating user ID list are transmitted to the document management service 800. The document management service 800 updates the user ID 1303 of the document data information 1300.

The description has thus been made on the method where when the user having registered the document withdraws participation from the destination group ID 1312 designated at the document registration, the document is not updated and change in document owner is suggested to the user having registered the document.

Thus, according to the foregoing embodiments, the content management apparatus that manages content can control access authorization, such as document viewing and document update according to the group setting of the posting management service.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-119886, filed Jun. 6, 2013, which is hereby incorporated by reference herein in its entirety.

What is claimed is:

1. A content management apparatus for providing a content management service that manages contents, the content management apparatus comprising:

a processor; and a memory coupled with the processor, the memory containing instructions that, when executed by the processor, cause the processor to perform operations comprising:

acquiring, from a posting management service provided by a posting management server, information of groups which are used for the posting management service when receiving a registration screen display request from a client apparatus of a first user, wherein the registration screen display request is a request for displaying a registration screen that causes the first user to designate a new content to be registered and a selected group for which a message is to be posted, wherein the posting management server provides the posting management service that manages messages and comments posted by users, and wherein the posting management server is different from the content management apparatus;

providing the registration screen to the client apparatus of the first user, wherein the registration screen causes the first user to designate the new content to be registered into the content management service, and wherein the registration screen further causes the first user to designate, from the acquired information of groups, a selected group for which a message is to be posted;

receiving, from the client apparatus of the first user, a registration request including the new content and information of the selected group for which a message is to be posted, wherein the selected group is designated from the acquired information of groups by the first user;

storing, in the content management service provided by the content management apparatus, the received new content and content information of the stored new content that is associated with the received information of the selected group;

transmitting a posting request for writing information of storage destination as a message in a group region corresponding to the selected group of the posting management server, wherein the written information of storage destination is required to access the stored new content;

acquiring, when receiving an access request for accessing the stored new content from a second user using the written information of storage destination, group information of the second user from the posting management server; and determining whether or not the received access request is to be approved, based on the acquired group information of the second user and the information of the selected group being stored in association with the content information of the stored new content corresponding to the access request.

2. The content management apparatus according to claim 1, wherein the registration screen causes the first user to designate, from information of groups which are used for providing multiple posting management services by multiple posting management servers, a plurality of groups for which a message is to be posted.

3. A method carried out in a content management apparatus, the method comprising the steps of:

acquiring, from a posting management service provided by a posting management server, information of groups which are used for the posting management service when receiving a registration screen display request from a client apparatus of a first user, wherein the registration screen display request is a request for displaying a registration screen that causes the first user to designate a new content to be registered and a selected group for which a message is to be posted, wherein the posting management server provides the posting management service that manages messages and comments posted by users, and wherein the posting management server is different from the content management apparatus;

providing the registration screen to the client apparatus of the first user, wherein the registration screen causes the first user to designate the new content to be registered into the content management service, and wherein the registration screen further causes the first user to designate, from the acquired information of groups, the selected group for which a message is to be posted;

receiving, from the client apparatus of the first user, a registration request including the new content and information of the selected group for which a message is to be posted, wherein the selected group is designated from the acquired information of groups by the first user;

storing, in the content management service provided by the content management apparatus, the received new content and content information of the stored new content that is associated with the received information of the selected group;

transmitting a posting request for writing information of storage destination as a message in a group region corresponding to the selected group of the posting management server, wherein the written information of storage destination is required to access the stored new content;

acquiring, upon receiving an access request for accessing the stored new content from a second user using the written information of storage destination, group information of the second user from the posting management service; and determining whether or not the received access request is to be approved, based on the acquired group information of the second user and the stored information of the selected group in association with the content information of the stored new content corresponding to the access request.

4. A non-transitory computer-readable storage medium storing a computer program for causing a computer to provide a content management service that manages contents, wherein the computer program includes instructions for causing the computer to perform:

acquiring, from a posting management service provided by a posting management server, information of groups which are used for the posting management service when receiving a registration screen display request from a client apparatus of a first user, wherein the registration screen display request is a request for displaying a registration screen that causes the first user to designate a new content to be registered and a selected group for which a message is to be posted, wherein the posting management server provides the posting management service that manages messages and comments posted by users, and wherein the posting management service is different from the content management service;

providing the registration screen to the client apparatus of the first user, wherein the registration screen causes the first user to designate the new content to be registered into the content management service, and wherein the registration screen further causes the first user to designate, from the acquired information of groups, the selected group for which a message is to be posted;

receiving, from the client apparatus of the first user, a registration request including the new content and information of the selected group for which a message is to be posted, wherein the selected group is designated from the acquired information of groups by the first user;

storing, in the content management service provided by the content management apparatus, the received new content and content information of the stored new content that is associated with the received information of the selected group;

transmitting a posting request for writing information of storage destination as a message in a group region corresponding to the selected group of the posting management server, wherein the written information of storage destination is required to access the stored new content;

acquiring, upon receiving an access request for accessing the stored new content from a second user using the written information of storage destination, group information of the second user from the posting management server; and determining whether or not the received access request is to be approved, based on the acquired group information of the second user and the information of the selected group being stored in association with the content information of the stored new content corresponding to the access request.

* * * * *